United States Patent
Uzaki et al.

(10) Patent No.: US 11,364,444 B2
(45) Date of Patent: Jun. 21, 2022

(54) CHAT TERMINAL DEVICE, CHAT SYSTEM, CHAT INPUT METHOD, AND RECORDING MEDIUM

(71) Applicant: JVCKENWOOD Corporation, Yokohama (JP)

(72) Inventors: Jiro Uzaki, Yokohama (JP); Mizuki Ohara, Yokohama (JP); Naoyuki Okada, Yokohama (JP); Shun Tanaka, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/006,949

(22) Filed: Aug. 31, 2020

(65) Prior Publication Data

US 2021/0060443 A1 Mar. 4, 2021

(30) Foreign Application Priority Data

Sep. 3, 2019 (JP) .............................. JP2019-160036
Sep. 3, 2019 (JP) .............................. JP2019-160652

(51) Int. Cl.
*A63F 13/87* (2014.01)
*A63F 13/355* (2014.01)
*A63F 13/44* (2014.01)
*A63F 13/46* (2014.01)

(52) U.S. Cl.
CPC ............ *A63F 13/87* (2014.09); *A63F 13/355* (2014.09); *A63F 13/44* (2014.09); *A63F 13/46* (2014.09)

(58) Field of Classification Search
CPC ....................................................... A63F 13/87
See application file for complete search history.

(56) References Cited

U.S. PATENT DOCUMENTS

| 8,821,297 | B1 * | 9/2014 | Nagata | A63F 13/332 463/42 |
| 2012/0309542 | A1 * | 12/2012 | Nogami | A63F 13/12 463/42 |
| 2015/0038235 | A1 * | 2/2015 | Kamekawa | A63F 13/87 463/42 |
| 2018/0343136 | A1 * | 11/2018 | Onoda | H04L 51/04 |

FOREIGN PATENT DOCUMENTS

JP 2015-071076 4/2015

* cited by examiner

*Primary Examiner* — Seng H Lim
(74) *Attorney, Agent, or Firm* — Amin, Turocy & Watson, LLP

(57) ABSTRACT

A chat terminal device includes: a communication unit that receives game situation data indicating a situation of a game and chat data indicating a content of a chat corresponding to the game from a server that manages the game situation data and the chat data, and transmits chat data to the server; a storage unit that stores therein the game situation data and the chat data received through the communication unit; an input unit through which chat data is input; a display that displays the chat data; and a control unit that causes the display to display, as candidate data, chat data having a content corresponding to game situation data at an input point in time, for inputting of the chat data through the input unit.

9 Claims, 14 Drawing Sheets

| INPUT ID | INPUTTER ID | INPUT CONTENT | TAG INFORMATION |
|---|---|---|---|
| C054 | 999 | BATTER 007 HITS BALL TO CENTER FIELD IN BOTTOM OF EIGHTH INNING | TC0054 |
| C055 | 052 | ○○○ | TC0055 |
| C056 | 017 | △△△ | TC0056 |
| C057 | 038 | ××× | TC0057 |
| C058 | 999 | BATTER 008 IS STRUCK OUT IN BOTTOM OF EIGHTH INNING | TC0058 |
| C059 | 052 | □□□ | TC0059 |
| C060 | 038 | ○△○ | TC0060 |
| C061 | 017 | △□× | TC0061 |
|  |  |  |  |

| TAG INFORMATION | UPLOAD TIME |
|---|---|
| TC0054 | 10:03:05 |
| TC0055 | 10:03:21 |
| TC0056 | 10:03:55 |
| TC0057 | 10:06:37 |
| TC0058 | 10:08:12 |
| TC0059 | 10:08:55 |
| TC0060 | 10:09:20 |
| TC0061 | 10:09:25 |
| ⋮ | ⋮ |

| PHRASE | PRIORITY | PHRASE | PRIORITY |
|---|---|---|---|
| YEAH! | 1 | IT'S UNFORTUNATE | 1 |
| CONGRATULATIONS! | 2 | IT'S SCREWED UP | 2 |
| THAT'S GREAT | 3 | MAYBE NEXT TIME | 3 |
| ⋮ | | ⋮ | |

| TARGET DATA | REGISTRATION SITUATION |
|---|---|
| TARGET TEAM | ABC |
| TARGET PLAYER | 007 |
| TARGET SCORE | - |

FIG.11

| INPUT ID | INPUTTER ID | INPUT CONTENT | COMMENT IN-FORMATION | TAG IN-FORMATION |
|---|---|---|---|---|
| C054 | 999 | BATTER 007 HITS BALL TO CENTER FIELD IN BOTTOM OF EIGHTH INNING | | TC0054 |
| C055 | 052 | ○○○ | C054 | TC0055 |
| C056 | 017 | △△△ | C054 | TC0056 |
| C057 | 038 | ××× | | TC0057 |
| C058 | 999 | BATTER 008 IS STRUCK OUT IN BOTTOM OF EIGHTH INNING | | TC0058 |
| C059 | 052 | □□□ | C058 | TC0059 |
| C060 | 038 | ○△○ | | TC0060 |
| C061 | 017 | △□× | | TC0061 |
| | | | | |

FIG.12

| TAG INFORMATION | UPLOAD TIME |
|---|---|
| TC0054 | 10:03:05 |
| TC0055 | 10:03:21 |
| TC0056 | 10:03:55 |
| TC0057 | ⋮ |
| TC0058 | 10:08:12 |
| TC0059 | 10:08:55 |
| TC0060 | 10:09:20 |
| TC0061 | 10:09:25 |
| ⋮ | ⋮ |

| PHRASE | PRIORITY | PHRASE | PRIORITY |
|---|---|---|---|
| YEAH! | 1 | IT'S UNFORTUNATE | 1 |
| CONGRATULATIONS! | 2 | IT'S SCREWED UP | 2 |
| THAT'S GREAT | 3 | MAYBE NEXT TIME | 3 |
| ⋮ | | ⋮ | |

CHAT TERMINAL DEVICE, CHAT SYSTEM, CHAT INPUT METHOD, AND RECORDING MEDIUM

CROSS-REFERENCE TO RELATED APPLICATIONS

This application claims priority from Japanese Application No. 2019-160036, filed on Sep. 3, 2019, and Japanese Application No. 2019-160652, filed on Sep. 3, 2019, the contents of both of which are incorporated by reference herein in its entirety.

BACKGROUND OF THE INVENTION

1. Field of the Invention

The present invention relates to a chat terminal device, a chat system, a chat input method, and a recording medium.

2. Description of the Related Art

When a game such as a sports competition or a game competition is held, for example, a user informs a game situation or the like by using a chat, such that even a person who cannot participate in the game or cannot directly watch the game can grasp the game situation. For example, a system that displays game score information and a chat between users on the same screen has been known (see JP 2015-71076 A, for example).

In the above-described system, the user needs to input a chat frequently, and thus it may be difficult to concentrate on the game. Therefore, there has been a demand to reduce a time and effort required for the user to input a chat.

SUMMARY OF THE INVENTION

According to one aspect of the present disclosure, a chat terminal device includes a communication unit, a storage unit, an input unit, a display, and a control unit. The communication unit is configured to receive game situation data indicating a situation of a game and chat data indicating a content of a chat corresponding to the game from a server that manages the game situation data and the chat data, and is configured to transmit the chat data to the server. The storage unit stores therein the game situation data and the chat data received through the communication unit. Through the input unit, the chat data is input. The display is configured to display the chat data. The control unit causes the display to display, as candidate data, the chat data having a content corresponding to the game situation data at an input point in time, for inputting of the chat data through the input unit.

According to another aspect of the present disclosure, a chat input method includes: receiving pieces of game situation data each indicating a situation of a game and pieces of chat data each indicating a content of a chat corresponding to the game from a server that manages the pieces of game situation data and the pieces of chat data; storing, in a storage unit, the received pieces of game situation data and chat data; causing a display to display, as pieces of candidate data, the pieces of chat data each having a content corresponding to the game situation data at an input point in time, for inputting of the chat data; and transmitting, in response to selection of one piece of the pieces of candidate data displayed on the display, the selected candidate data as the chat data to the server.

According to still another aspect of the present disclosure, a non-transitory computer-readable recording medium containing a chat input program causes a computer to perform: receiving pieces of game situation data each indicating a situation of a game and pieces of chat data each indicating a content of a chat corresponding to the game from the server that manages the pieces of game situation data and the pieces of chat data; storing, in a storage unit, the received pieces of game situation data and chat data; causing a display to display, as pieces of candidate data, the pieces of chat data each having a content corresponding to the game situation data at an input point in time, for inputting of the chat data; and transmitting, in response to selection of one piece of the pieces of candidate data displayed on the display, the selected candidate data as the chat data to the server.

Additional aspects, objects, embodiments and advantages of the present teachings will become apparent upon reading the following detailed description in view of the appended drawings and claims.

BRIEF DESCRIPTION OF THE DRAWINGS

FIG. 5 is a diagram illustrating an example of pieces of candidate data stored in a candidate data storage unit;

FIG. 6 is a diagram illustrating an example of registration data stored in a registration data storage unit;

FIG. 11 is a diagram illustrating an example of chat data stored in a chat data storage unit;

FIG. 12 is a diagram illustrating an example of synchronization data stored in a synchronization data storage unit;

FIG. 13 is a diagram illustrating an example of candidate data stored in a candidate data storage unit;

DETAILED DESCRIPTION OF THE PREFERRED EMBODIMENTS

Hereinafter, embodiments of the present invention will be described with reference to the drawings. Note that the present invention is not limited to these embodiments. Further, components in the following embodiments include those that can be easily replaced by those skilled in the art, or those that are substantially the same.

First Embodiment

Figure 1:
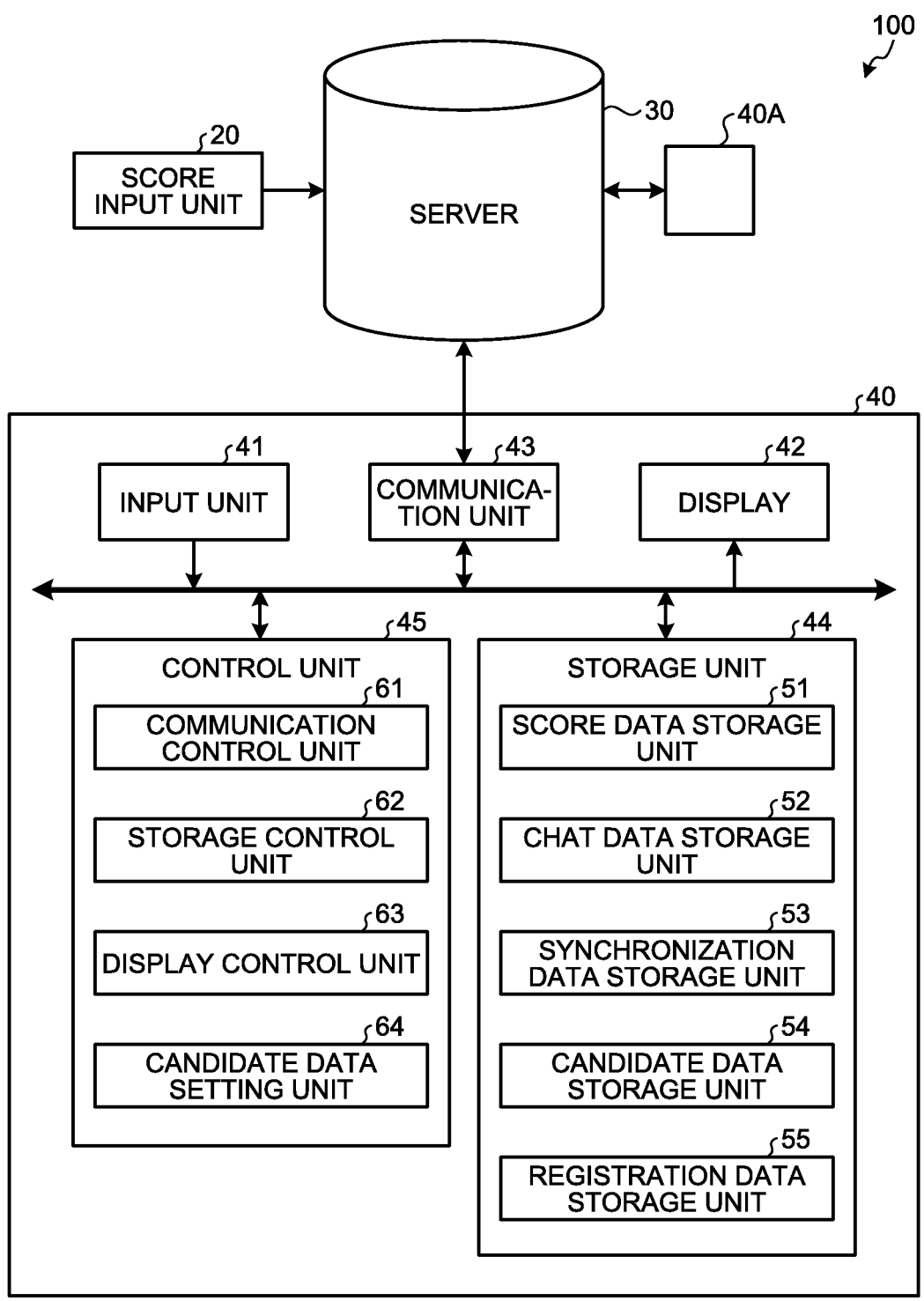
FIG. 1 is a block diagram illustrating an example of a chat system according to a first embodiment.

FIG. 1 is a block diagram illustrating an example of a chat system 100 according to a first embodiment. The chat system 100 illustrated in FIG. 1 is used when chatting about a content of a game in a sports competition such as a baseball game, for example. By using the chat system 100, it is possible to report a game situation and the like by using a chat so that even a person who cannot participate in the game or directly watch the game can grasp the game situation. In the following, a baseball game will be described as an example of the sports competition, but the present invention is not limited thereto and the same description can be applied to other sports competitions such as a soccer game, a volleyball game, a tennis game, and a badminton game. Further, the chat system 100 is also adaptable to competitions such as a dance contest (dancing competition), a piano contest (performance competition), a karuta competition (card game competition or table game competition), a karaoke contest (singing competition), and a game contest, other than the sports competitions.

As illustrated in FIG. 1, the chat system 100 includes a score input unit 20, a server 30, and chat terminal devices 40 and 40A. Note that the chat system 100 may include a camera (not illustrated). In this case, the camera captures a content of the game in a game site, for example. Video data captured by the camera is transmitted to, for example, the server 30 and managed by the server 30. The number of cameras is plural, for example. Further, the camera may be any camera as long as it can capture video data. The camera may be, for example, a camera embedded in a mobile phone, a smartphone, or the like. When the camera captures video data, the camera includes data indicating a capturing time in the video data.

The score input unit 20 inputs game situation data indicating a situation of the game to the server 30. In the present embodiment, examples of game situation data indicating a situation of a baseball game can include score data. The score data is data that constitutes a score described in a baseball score book, and is an individual event that constitutes a series of events starting from a pitch of a pitcher. The score is a set of score data. Therefore, each time the pitcher throws one ball, a plurality of pieces of score data are created, such that one score is created. For example, in a case where a result of batting in a state in which a runner is on first base is a fly out to right and the first base runner is also tagged out, score data indicating that the batter is out, score data indicating a fly to right, and score data indicating that the first base runner is out are created, and one score is constituted by these pieces of score data.

In addition to the score data described above, score data such as an action of the batter, an action of a fielder, determination of a count, a state of an advancement of a runner when there is already a runner on base, and other play of batters or fielders can be included in the score. Specifically, the score can include score data such as a strike, a ball, a foul, a batting result, a type of batted ball, a catching fielder, or an advancement result. The batting result is information such as out, a single, a double, a triple, or a home run. The type of batted ball is information such as a ground ball, a line drive, a fly ball, or a bunt, and may be categorized into more types. The catching fielder is information for specifying a fielder who actually caught the batted ball or a defensive position of the fielder. The advancement result is information regarding an advancement of a runner on base, such as "from first base to second base", and can include other play of batters and fielders.

Examples of the score input unit 20 can include an application for inputting the above score data into the server 30 as electronic data. In this case, the score input unit 20 may be provided in a processing device such as a personal computer installed outside the server 30. Alternatively, the score input unit 20 may be provided in the server 30. Note that, in the present embodiment, the score input unit 20 need not necessarily be provided.

The server 30 comprehensively manages the chat system 100. The server 30 includes various applications, data, programs, and the like for managing the chat system 100. As the server 30, for example, a personal computer, a workstation or the like is used, but the present invention is not limited thereto.

A plurality of chat groups are set in the server 30. Each of the chat groups is individually set for each competition, each game, or each team, for example. The server 30 performs various processing to be described below for each chat group.

Chat data indicating a content of a chat corresponding to a game is input to the server 30. The server 30 stores the input chat data. As the server 30 stores the chat data, the chat data can be received from the server 30. When the chat data is stored, the server 30 includes, in the chat data, data indicating a time (hereinafter, referred to as upload time) when the chat data is stored. That is, the chat data stored in the server 30 includes the data indicating the upload time. The server 30 includes a management application that manages the video data and the chat data.

Further, score data may be input from the score input unit 20 to the server 30. In this case, the server 30 may generate chat data based on the input score data and store the chat data. For example, the server 30 can generate chat data that expresses a content of the score data with characters each time new score data is input. Accordingly, when the score data is updated, the updated score data can be checked as chat information. Further, video data captured by the camera may be input to the server 30.

The chat terminal devices 40 and 40A each include an input unit 41, a display 42, a communication unit 43, a storage unit 44, and a control unit 45. The input unit 41, the display 42, the communication unit 43, the storage unit 44, and the control unit 45 are connected via, for example, a bus line. Examples of the chat terminal device 40 include a mobile information terminal such as a mobile phone, a smartphone, a tablet PC, or a laptop personal computer.

Through the input unit 41, a predetermined input operation for inputting information such as chat data can be performed. The input unit 41 outputs an instruction signal for the control unit 45 according to an input operation. An input device such as a touch panel is used as the input unit 41. Note that, as the input unit 41, a button, a lever, a dial, a switch, or another input device may be used, in addition to or instead of the touch panel. The input unit 41 outputs an instruction signal according to a predetermined input operation. The display 42 displays various information including a character and an image. The display 42 includes a display panel such as a liquid crystal panel.

Figure 2:
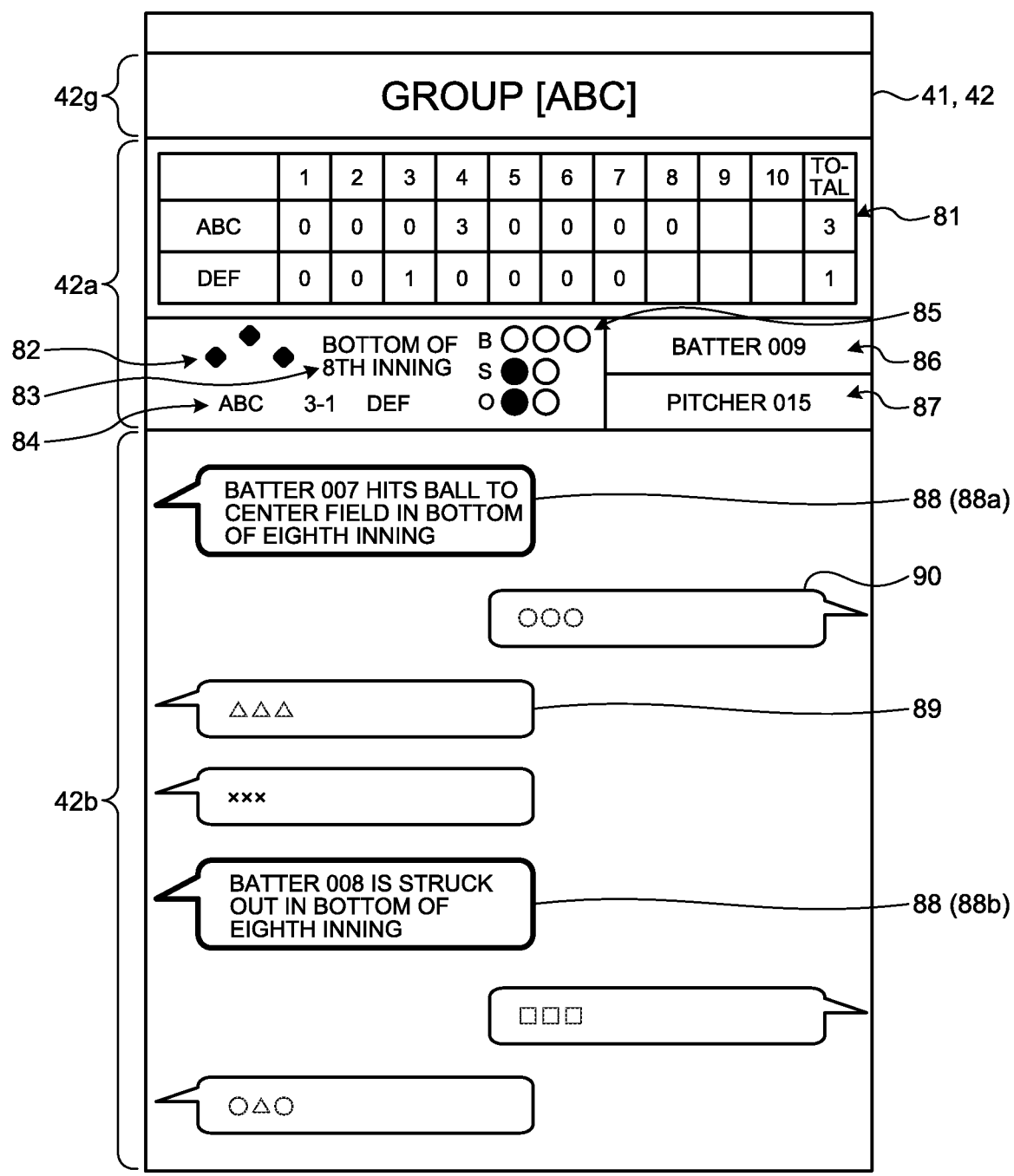
FIG. 2 is a diagram illustrating an example of an input unit and a display of a chat terminal device according to the first embodiment.

FIG. 2 is a diagram illustrating an example of the input unit 41 and the display 42 of the chat terminal device 40 according to the present embodiment. As illustrated in FIG. 2, the chat terminal device 40 includes, for example, the touch panel type input unit 41 and the display 42. That is, a touch panel as the input unit 41 is arranged so as to overlap with a display panel as the display 42.

The display 42 displays, for example, a score display region 42a, a chat display region 42b, and a group display region 42g. Score data is displayed in the score display region 42a. For example, in the score display region 42a, a scoreboard 81 for displaying a score for each inning, an advancement display 82 for displaying an advancement situation of a runner, an inning display 83 for displaying an inning, a score display 84 for displaying a total score of each team, a count display 85 for displaying the count of balls and the count of outs, a batter display 86 for displaying a batter, and a pitcher display 87 for displaying a pitcher are displayed. Note that the displaying in the score display region 42a is not limited thereto, and some displays may be omitted, for example.

Chat data is displayed in the chat display region 42b. For example, in the chat display region 42b, a server message 88 which is chat data generated by the server 30, other's message 89 which is chat data input through another chat terminal device 40A different from the chat terminal device 40, a user's message 90 which is chat data input through the chat terminal device 40, or the like is displayed. The server message 88 indicates a content of score data input to the server 30, for example, in a form of characters. A server message 88a on the upper side of FIG. 2 has a content indicating that, for example, the batter 007 hits a ball to center field in the bottom of the eighth inning. Further, a server message 88b on the lower side of FIG. 2 has a content indicating that the batter 008 is struck out in the bottom of the eighth inning.

Note that the server message 88 and the other's message 89 are displayed in an area on the left side of the chat display region 42b, for example. Further, the user's message 90 is displayed in an area on the right side of the chat display region 42b, for example. Further, the server message 88 and the other's message 89 may be displayed in a distinguishable form. For example, the type of a frame in which each message is displayed may be different for each message. As a result, the server message 88 and the other's message 89 can be distinguished. Information on a group to which an operator of the chat terminal device 40 belongs is displayed in the group display region 42g. Note that the user's message 90 may be a message composed of text data.

In a case where a touch operation, a scroll operation, or the like is performed on a predetermined region in a surface of the touch panel, the input unit 41 outputs a predetermined instruction signal including position information of the region on which the operation is performed, and an operation content. The position information is set so as to correspond to a position in the display 42, for example. Note that the configurations of the input unit 41 and the display 42 are not limited to the above-described configurations.

The communication unit 43 communicates information with an external device is a wired or wireless manner. The communication unit 43 transmits/receives video data, chat data, score data, and the like to/from the external server 30, for example.

The storage unit 44 includes a storage such as a hard disk drive or a solid state drive. Note that an external storage medium such as a removable disk may be used as the storage unit 44. The storage unit 44 stores an operating system of the chat terminal device 40, various programs for controlling operations of the input unit 41, the display 42, and the communication unit 43, a chat application for chatting, various programs, data, and the like. For example, the storage unit 44 may store frame data such as the score display region 42a, the chat display region 42b, or the group display region 42g to be displayed on the display 42.

In addition, the storage unit 44 stores therein a chat input program that causes a computer to perform: receiving pieces of game situation data each indicating a situation of a game and pieces of chat data each indicating a content of a chat corresponding to the game from the server that manages the pieces of game situation data and the pieces of chat data; storing the received pieces of game situation data and chat data; displaying, for inputting of the chat data, pieces of chat data each having a content corresponding to the game situation data at an input point in time, as pieces of candidate data on the display; and transmitting, in response to selection of one piece of the pieces of candidate data displayed on the display, the selected candidate data as the chat data to the server.

The storage unit 44 includes a score data storage unit 51, a chat data storage unit 52, a synchronization data storage unit 53, a candidate data storage unit 54, and a registration data storage unit 55.

The score data storage unit 51 stores the score data received through the communication unit 43. Examples of the score data stored in the score data storage unit 51 include information such as batter score data, runner score data, and tag information. Note that the score data may include other information such as a fielder's action.

Figure 3:
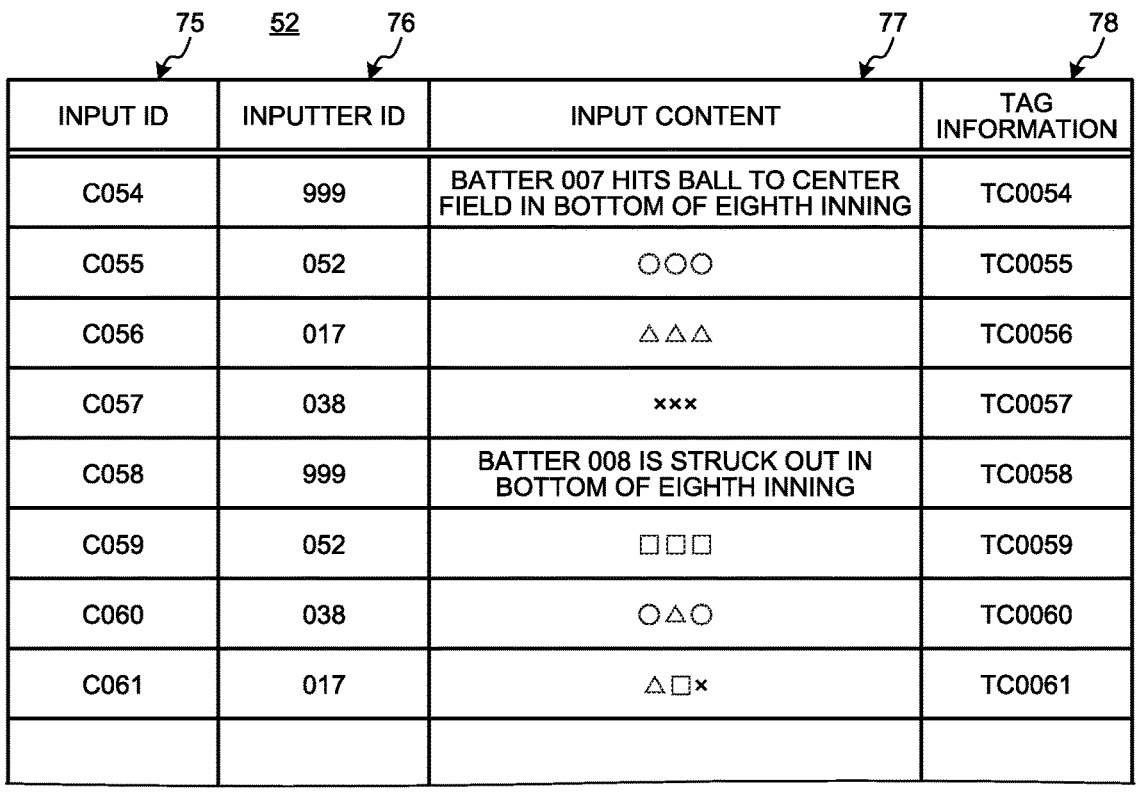
FIG. 3 is a diagram illustrating an example of chat data stored in a chat data storage unit.

The chat data storage unit 52 stores the chat data received through the communication unit 43. FIG. 3 is a diagram illustrating an example of the chat data stored in the chat data storage unit 52. As illustrated in FIG. 3, the chat data includes an input ID 75, an inputter ID 76, an input content 77, and tag information 78.

One input ID 75 is created each time the chat data is input to or generated in the server 30. The inputter ID 76 is information for identifying an inputter of one piece of chat data. For example, in a case of the chat data generated by the server 30, the inputter ID 76 may be a predetermined value (for example, "999" or the like). The input content 77 is information indicating a content of a message displayed in the chat display region 42b. The input content 77 includes, for example, character data or predetermined illustration data. The tag information 78 is information for identifying chat data created for each input ID 75. One piece of tag information 78 is created each time the input ID 75 is created. Tag numbers (TC0054, TC0055, . . . ) are given to the tag information 78 in ascending order as indexes. Note that an ID number of the input ID 75 may be used as the tag information.

Figure 4:
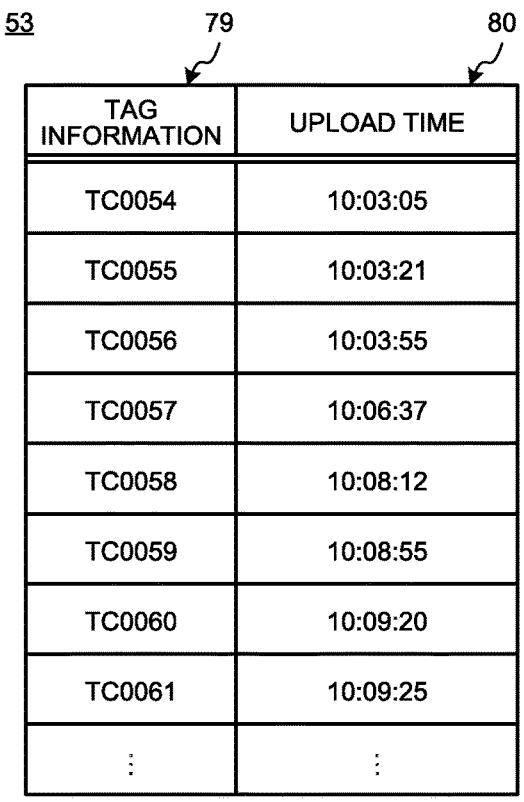
FIG. 4 is a diagram illustrating an example of synchronization data stored in a synchronization data storage unit.

The synchronization data storage unit 53 stores therein synchronization data that associates score data with chat data. FIG. 4 is a diagram illustrating an example of the synchronization data stored in the synchronization data storage unit 53. As illustrated in FIG. 4, the synchronization data includes tag information 79 and upload time information 80. The tag information 79 is information corresponding to the tag information 78 of the chat data described above. The tag information 79 is arranged in the order according to the upload time information 80. For example, the same tag number (TC0054, TC0055, . . . ) as the corresponding tag information 78 is given to the tag information 79, but the present invention is not limited thereto. For example, a series of tag numbers independent of the tag information 78 may be added to the tag information 79. The upload time information 80 indicates a time when the score data and the chat data associated with the tag information 79 are uploaded to the server 30. With the tag information 79 and the upload time information 80, the score data and the chat data are stored in association with each other based on the upload time.

The candidate data storage unit 54 stores a plurality of pieces of candidate data. The candidate data is chat data having a content corresponding to game situation data at the time of inputting the chat data through the input unit 41. FIG. 5 is a diagram illustrating an example of the pieces of candidate data stored in the candidate data storage unit 54. As illustrated in FIG. 5, examples of the pieces of candidate data include phrases for expressing pleasure, celebration, and the like when the score is favorable, such as "yeah!", "congratulations", and "that's great", and phrases for expressing disappointment and the like when the score is unfavorable, such as "it's unfortunate" and "it's screwed up". In the candidate data, a priority is set for each of a case where the score is favorable and a case where the score is unfavorable. The pieces of candidate data are displayed in descending order of priority when inputting chat data. As for the phrases exemplified above as the candidate data, phrases registered in a text input tool or the like mounted on the chat terminal device 40 may be used, or phrases input as chat data may be used.

The registration data storage unit 55 stores registration data registered by a user who uses the chat terminal device 40. FIG. 6 is a diagram illustrating an example of the registration data stored in the registration data storage unit 55. As illustrated in FIG. 6, examples of the registration data include a team to which the user belongs, a game participant (player) designated by the user, and score data designated by the user. The registration data is used when displaying the candidate data and will be described in detail later.

The control unit 45 controls each of the input unit 41, the display 42, the communication unit 43, and the storage unit 44. Further, the control unit 45 performs arithmetic operation, processing, and the like according to the instruction signal from the input unit 41. The control unit 45 includes a processing device such as a central processing unit (CPU), and a storage device such as a random access memory (RAM) and a read only memory (ROM). The control unit 45 includes a communication control unit 61, a storage control unit 62, a display control unit 63, and a candidate data setting unit 64.

The communication control unit 61 accesses the server 30 via the communication unit 43 to receive score data, chat data, and the like stored in the server 30. In addition, the communication control unit 61 transmits chat data input or selected by the input unit 41 to the server 30 via the communication unit 43.

The storage control unit 62 stores, in the storage unit 44, the score data, the chat data, and the like acquired from the server 30 in association with the upload time.

The display control unit 63 controls a display content to be displayed on the display 42. The display control unit 63 controls a display content in the score display region 42a based on the score data acquired via the communication unit 43.

Further, the display control unit 63 controls a display content in the chat display region 42b based on the chat data acquired via the communication unit 43. When displaying the chat data in the chat display region 42b, the display control unit 63 displays a displayable number of pieces of chat data in the chat display region 42b side by side in one direction in time series based on the upload time. In the present embodiment, for example, as illustrated in FIG. 2, the pieces of chat data are displayed side by side in time series from the upper side to the lower side of the chat display region 42b in the drawing.

In addition, in a case where new chat data is stored in the server 30, the display control unit 63 acquires the latest chat data stored in the server 30 via the communication unit 43, and updates the display content in the chat display region 42b. In this case, the display control unit 63 determines whether a space for displaying new chat data exits below chat data displayed most recently in time series in the chat display region 42b. In a case where the space for displaying new chat data exits, the display control unit 63 displays new chat data in the space. Further, in a case where no space for displaying new chat data exists, the display control unit 63 scrolls the entire chat display region 42b in a direction to push, toward the upper side of the chat display region 42b, the oldest chat data displayed in the chat display region 42b in time series, that is the uppermost chat data displayed in the chat display region 42b. Then, the display control unit 63 displays new chat data in a space on the lower side of the chat display region 42b that is vacated by scrolling. As a result, the display control unit 63 can update the chat data displayed in the chat display region 42b in real time each time new chat data is uploaded to the server 30 and stored in the storage unit 44.

Further, the display control unit 63 can control the display content in the chat display region 42b based on past chat data stored in the storage unit 44. For example, when the operator slides a touch position upward or downward in a state of touching the chat display region 42b of the input unit (touch panel) 41, that is, when the operator performs an operation of manually scrolling the chat display region 42b, the display control unit 63 changes the chat data displayed in the chat display region 42b according to a scroll direction and a scroll amount. For example, when the operator slides the touch position upward, chat data uploaded later than the chat data that is currently displayed is displayed in the chat display region 42b. Further, when the operator slides the touch position downward, chat data uploaded earlier than the chat data that is currently displayed is displayed in the chat display region 42b. Note that a method of changing the chat data displayed in the chat display region 42b is not limited thereto, and another method such as a button, a keyboard, or a mouse may be used.

Figure 7:
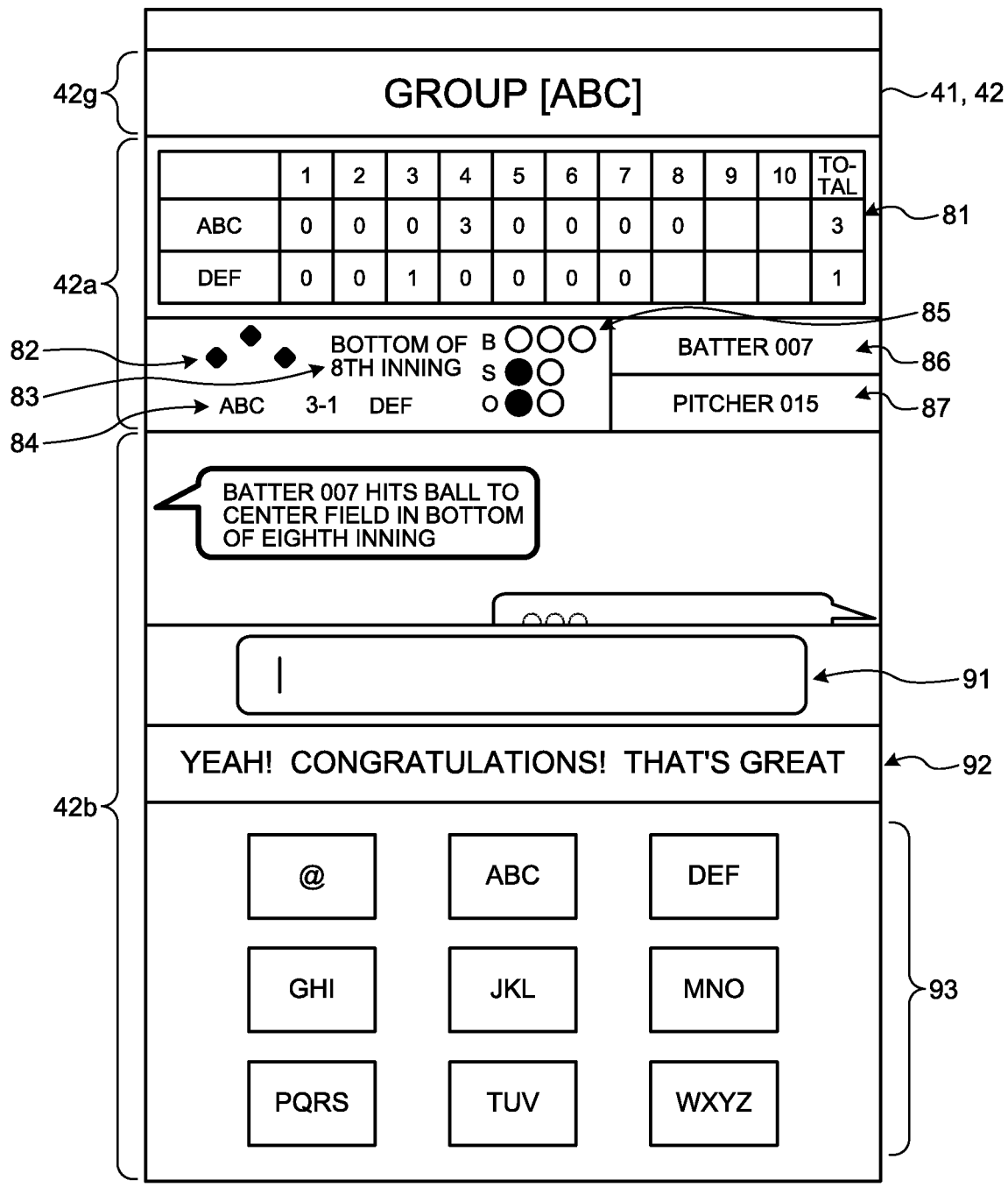
FIG. 7 is a diagram illustrating an example of an input screen for inputting chat data.

Further, in the present embodiment, the display control unit 63 displays a screen for inputting chat data when a predetermined operation for inputting new chat data is performed by the input unit 41. FIG. 7 is a diagram illustrating an example of the input screen for inputting chat data. As illustrated in FIG. 7, the display control unit 63 displays a chat data input section 91, a candidate data display section 92, and an input tool display section 93 on the display 42.

The candidate data setting unit 64 selects candidate data to be displayed on the candidate data display section 92 from pieces of candidate data stored in the candidate data storage unit 54 based on score data. For example, the candidate data setting unit 64 selects or sets candidate data based on the latest score data from a time when the screen for inputting chat data is displayed. In this case, as the candidate data, a phrase related to the latest score data can be selected or set.

Further, the candidate data setting unit 64 can select the candidate data based on the registration data stored in the registration data storage unit 55. For example, in a case where a team is registered as the registration data, when score data that is advantageous for the registered team is acquired, the candidate data setting unit 64 selects a phrase for a case where the score is favorable. On the other hand, when score data that is disadvantageous for the registered team is acquired, the candidate data setting unit 64 selects a phrase for a case where the score is unfavorable.

Further, for example, in a case where a player is registered as the registration data, when score data that is advantageous for the registered player is acquired, the candidate data setting unit 64 can select a phrase for a case where the score is favorable, and when score data that is disadvantageous for the registered player is acquired, the candidate data setting unit 64 can select a phrase for a case where the score is unfavorable, similarly to the above. Further, the candidate data setting unit 64 can set, as candidate data, a phrase including a name of the registered player.

Further, for example, in a case where predetermined score data is registered as the registration data, when the registered score data is acquired, the candidate data setting unit 64 selects a phrase corresponding to the registered score data. For example, when a home run is registered as the registration data and home run score data is acquired, the candidate data setting unit 64 can select, as candidate data, a phrase corresponding to the score data, such as "home run!". Moreover, in a case where both a team and a player are registered as the registration data, when a player of the registered team or the registered player hit a home run, the candidate data setting unit 64 can select or set candidate data in which a phrase for a case where the score is favorable, such as "nice home run" or "yeah, home run" and a phrase including the score data are combined with each other. On the other hand, in a case where a player of an opposing team, not the registered team, hit a home run, the candidate data setting unit 64 can select or set candidate data in which a phrase for a case where the score is unfavorable, such as "they got a home run" or "oh, no! it's a home run", and a phrase including the score data are combined with each other.

Figure 8:
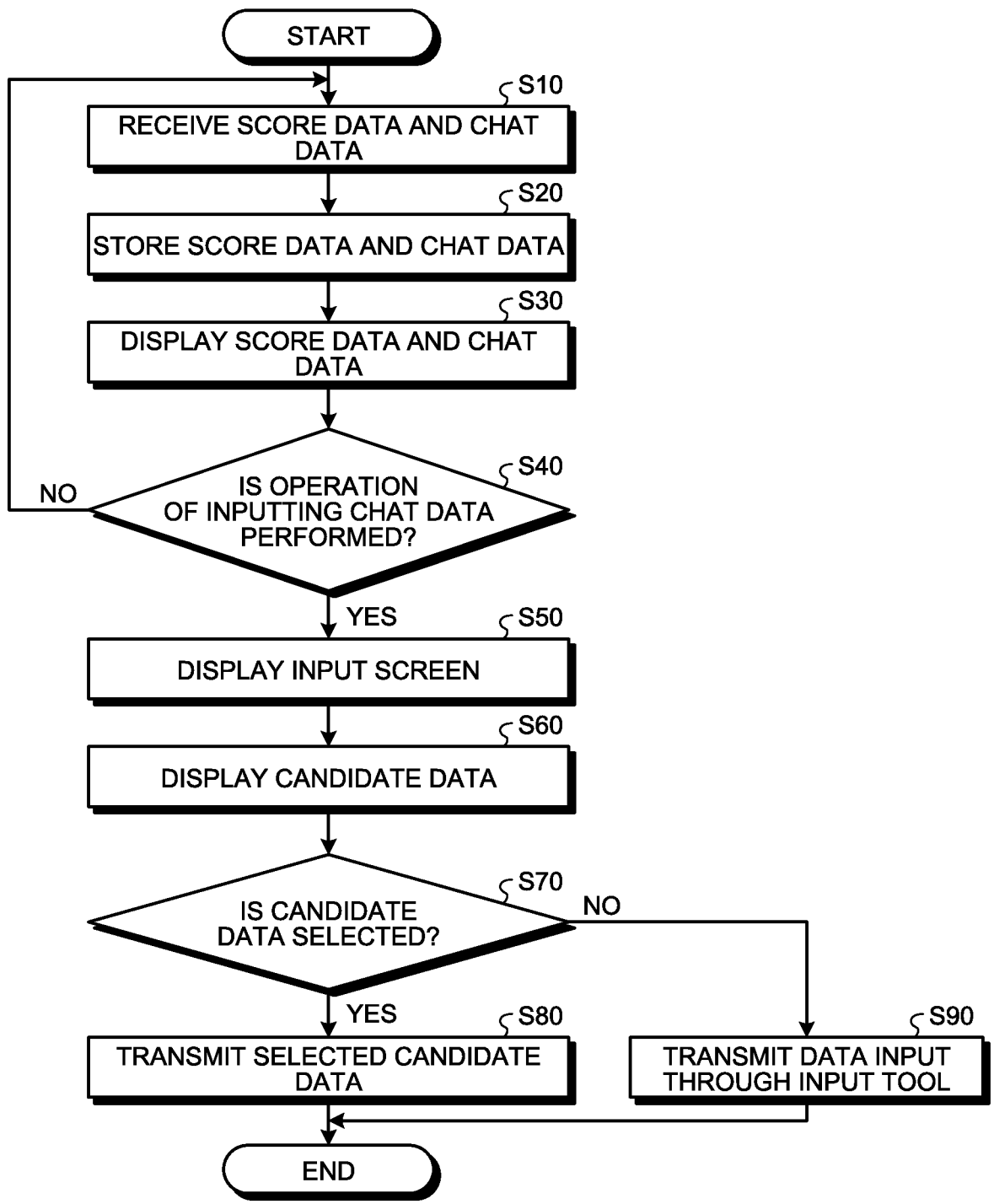
FIG. 8 is a flowchart illustrating an example of a chat input method.

Next, an operation of the chat system 100 configured as described above will be described. FIG. 8 is a flowchart illustrating an example of a chat input method. In the chat system 100 according to the present embodiment, in the server 30, score data is input through the score input unit 20 as the game progresses, and chat data is input through each of the chat terminal devices 40 and 40A and the like. The server 30 generates chat data based on the score data. The server 30 stores the score data and the chat data so that the chat terminal devices 40 and 40A and the like can receive the score data and the chat data.

In this state, the chat application is started in the chat terminal device 40. By starting the chat application, in the chat terminal device 40, the communication control unit 61 acquires the score data and the chat data from the server 30 (Step S10). When the score data and the chat data are acquired from the server 30, the storage control unit 62 stores the acquired score data and the chat data in the storage unit 44 in association with each other based on an upload time (Step S20). The display control unit 63 displays the score data and the chat data stored in the storage unit 44 on the display 42 (Step S30).

The control unit 45 determines whether a predetermined operation for inputting new chat data is performed (Step S40). In a case where it is determined that the operation is not performed (No in Step S40), the control unit 45 repeatedly performs the processing from Step S10.

In Step S40, in a case where it is determined that the predetermined operation is performed (Yes in Step S40), the display control unit 63 displays the input screen for inputting chat data (Step S50), and displays candidate data in the candidate data display section 92 of the input screen (Step S60). In Step S60, the candidate data setting unit 64 selects or sets the candidate data based on the latest score data from a time when the screen for inputting chat data is displayed.

The control unit 45 determines whether the candidate data displayed on the display 42 is selected (Step S70). For example, in a case where a region in the input unit 41 that overlaps with a display region of the candidate data displayed in the candidate data display section 92 is touched, the control unit 45 determines that the candidate data displayed in the touched region is selected. In a case where it is determined that the candidate data is selected (Yes in Step S70), the communication control unit 61 transmits the selected candidate data as chat data to the server 30 via the communication unit 43 (Step S80). Further, for example, when the region in the input unit 41 that overlaps with a display region of the input tool display section 93 is touched, the control unit 45 can determine that the candidate data is not selected. In a case where it is determined that the candidate data is not selected (No in Step S70), the communication control unit 61 transmits chat data input through an input tool displayed on the input tool display section 93 to the server 30 via the communication unit 43 (Step S90).

As described above, the chat terminal device 40 according to the present embodiment includes: the communication unit 43 that can receive score data indicating a situation of a game and chat data indicating a content of a chat corresponding to the game from the server 30 that manages the score data and the chat data, and can transmit chat data to the server 30; the storage unit 44 that stores the score data and the chat data acquired through the communication unit 43; the input unit 41 through which chat data can be input; the display 42 that can display the chat data; and the control unit 45 that causes the display 42 to display, as candidate data, chat data having a content corresponding to score data at an input point in time, for inputting of the chat data through the input unit 41.

Further, the chat system 100 according to the present embodiment includes: the server 30 that manages score data indicating a situation of a game and chat data indicating a content of a chat corresponding to the game; and the chat terminal device that includes the communication unit 43 that can receive the score data and the chat data from the server 30, and can transmit chat data to the server 30, the storage unit 44 that stores the score data and the chat data acquired through the communication unit 43, the input unit 41 through which chat data can be input, the display 42 that can display the chat data, and the control unit 45 that causes the display 42 to display, as candidate data, chat data having a content corresponding to score data at an input point in time, for inputting of the chat data through the input unit 41.

In addition, the chat input method according to the present embodiment includes: receiving pieces of score data each indicating a situation of a game and pieces of chat data each indicating a content of a chat corresponding to the game from the server 30 that manages the pieces of score data and the pieces of chat data; storing, in the storage unit 44, the acquired score data and chat data; displaying, in a case of inputting the chat data, pieces of chat data each having a content corresponding to the score data at an input point in time, as pieces of candidate data on the display 42; and transmitting, in response to selection of one piece of the pieces of candidate data displayed on the display 42, the selected candidate data as the chat data to the server.

In addition, the chat input program according to the present embodiment causes a computer to perform: receiving pieces of score data each indicating a situation of a game and pieces of chat data each indicating a content of a chat corresponding to the game from the server 30 that manages the pieces of score data and the pieces of chat data; storing the acquired score data and chat data; displaying, for inputting of the chat data, pieces of chat data each having a content corresponding to the score data at an input point in time, as pieces of candidate data on the display 42; and transmitting, in response to selection of one piece of the pieces of candidate data displayed on the display 42, the selected candidate data as the chat data to the server.

With this configuration, chat data can be input in response to selection of one piece of candidate data displayed on the display 42. Therefore, the user can easily input chat data in a short time. As a result, it is possible to reduce a time and effort required for the user to input a chat.

In the chat terminal device 40 according to the present embodiment, the control unit 45 sets, as candidate data, chat data having a content based on score data and registration data registered in advance. Therefore, candidate data according to a situation of the user can be displayed.

In the chat terminal device 40 according to the present embodiment, the registration data includes data regarding a team participating in a game or a participant participating in the game. As a result, it is possible to display candidate data according to a participant such as a team to which the user belongs or a player designated by the user.

In the chat terminal device 40 according to the present embodiment, the registration data includes predetermined score data in the game. Therefore, candidate data according to score data can be displayed.

Second Embodiment

Figure 9:
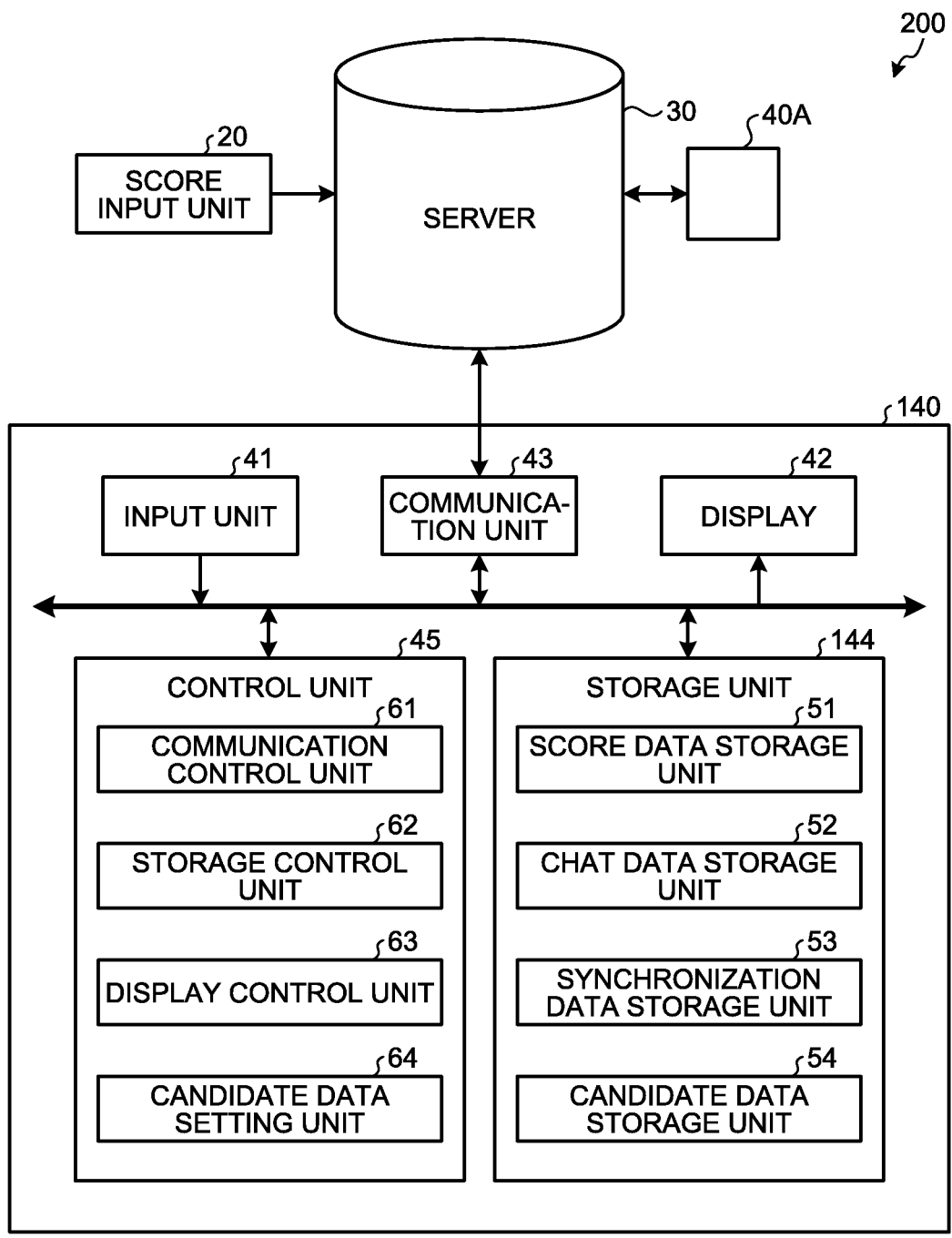
FIG. 9 is a block diagram illustrating an example of a chat system according to a second embodiment.

FIG. 9 is a block diagram illustrating an example of a chat system 200 according to a second embodiment. The chat system 200 illustrated in FIG. 9 is used when chatting about a content of a game in a sports competition such as a baseball game, for example. By using the chat system 200, it is possible to report a game situation and the like by using a chat so that even a person who cannot participate in the game or directly watch the game can grasp the game situation. In the following, a baseball game will be described as an example of the sports competition, but the present invention is not limited thereto and the same description can be applied to other sports competitions such as a soccer game, a volleyball game, a tennis game, and a badminton game. Further, the chat system 200 is also adaptable to competitions such as a dance contest (dancing competition), a piano contest (performance competition), a karuta competition (card game competition or table game competition), a karaoke contest (singing competition), and a game contest, other than the sports competitions.

As illustrated in FIG. 9, the chat system 200 includes a score input unit 20, a server 30, and chat terminal devices 140 and 40A. Note that the chat system 200 may include a camera (not illustrated). In this case, the camera captures a content of the game in a game site, for example. Video data captured by the camera is transmitted to, for example, the server 30 and managed by the server 30. The number of cameras is plural, for example. Further, the camera may be any camera as long as it can capture video data. The camera may be, for example, a camera embedded in a mobile phone, a smartphone, or the like. When the camera captures video data, the camera includes data indicating a capturing time in the video data.

The score input unit 20 inputs game situation data indicating a situation of the game to the server 30. In the present embodiment, examples of game situation data indicating a situation of a baseball game can include score data. The score data is data that constitutes a score described in a baseball score book, and is an individual event that constitutes a series of events starting from a pitch of a pitcher. The score is a set of score data. Therefore, each time the pitcher throws one ball, a plurality of pieces of score data are created, such that one score is created. For example, in a case where a result of batting in a state in which a runner is on first base is a fly out to right and the first base runner is also tagged out, score data indicating that the batter is out, score data indicating a fly to right, and score data indicating that the first base runner is out are created, and one score is constituted by these pieces of score data.

In addition to the score data described above, score data such as an action of the batter, an action of a fielder, determination of a count, a state of an advancement of a runner when there is already a runner on base, and other play of batters or fielders can be included in the score. Specifically, the score can include score data such as a strike, a ball, a foul, a batting result, a type of batted ball, a catching fielder, or an advancement result. The batting result is information such as out, a single, a double, a triple, or a home run. The type of batted ball is information such as a ground ball, a line drive, a fly ball, or a bunt, and may be categorized into more types. The catching fielder is information for specifying a fielder who actually caught the batted ball or a defensive position of the fielder. The advancement result is information regarding an advancement of a runner on base, such as "from first base to second base", and can include other play of batters and fielders.

Examples of the score input unit 20 can include an application for inputting the above score data into the server 30 as electronic data. In this case, the score input unit 20 may be provided in a processing device such as a personal computer installed outside the server 30. Alternatively, the score input unit 20 may be provided in the server 30. Note that, in the present embodiment, the score input unit 20 need not necessarily be provided.

The server 30 comprehensively manages the chat system 200. The server 30 includes various applications, data, programs, and the like for managing the chat system 200. As the server 30, for example, a personal computer, a workstation or the like is used, but the present invention is not limited thereto.

A plurality of chat groups are set in the server 30. Each of the chat groups is individually set for each competition, each game, or each team, for example. The server 30 performs various processing to be described below for each chat group.

Chat data indicating a content of a chat corresponding to a game is input to the server 30. The server 30 stores the input chat data. As the server 30 stores the chat data, the chat data can be received from the server 30. When the chat data is stored, the server 30 includes, in the chat data, data indicating a time (hereinafter, referred to as upload time) when the chat data is stored. That is, the chat data stored in the server 30 includes the data indicating the upload time. The server 30 includes a management application that manages the video data and the chat data.

Further, score data may be input from the score input unit 20 to the server 30. In this case, the server 30 may generate chat data based on the input score data and store the chat data. For example, the server 30 can generate chat data that expresses a content of the score data with characters each time new score data is input. Accordingly, when the score data is updated, the updated score data can be checked as chat information. Further, video data captured by the camera may be input to the server 30.

The chat terminal devices 140 and 40A each include an input unit 41, a display 42, a communication unit 43, a storage unit 144, and a control unit 45. The input unit 41, the display 42, the communication unit 43, the storage unit 144, and the control unit 45 are connected via, for example, a bus line. Examples of the chat terminal device 140 include a mobile information terminal such as a mobile phone, a smartphone, a tablet PC, or a laptop personal computer.

Through the input unit 41, a predetermined input operation for inputting information such as chat data can be performed. The input unit 41 outputs an instruction signal for the control unit 45 according to an input operation. An input device such as a touch panel is used as the input unit 41. Note that, as the input unit 41, a button, a lever, a dial, a switch, or another input device may be used, in addition to or instead of the touch panel. The input unit 41 outputs an instruction signal according to a predetermined input operation. The display 42 displays various information including a character and an image. The display 42 includes a display panel such as a liquid crystal panel.

Figure 10:
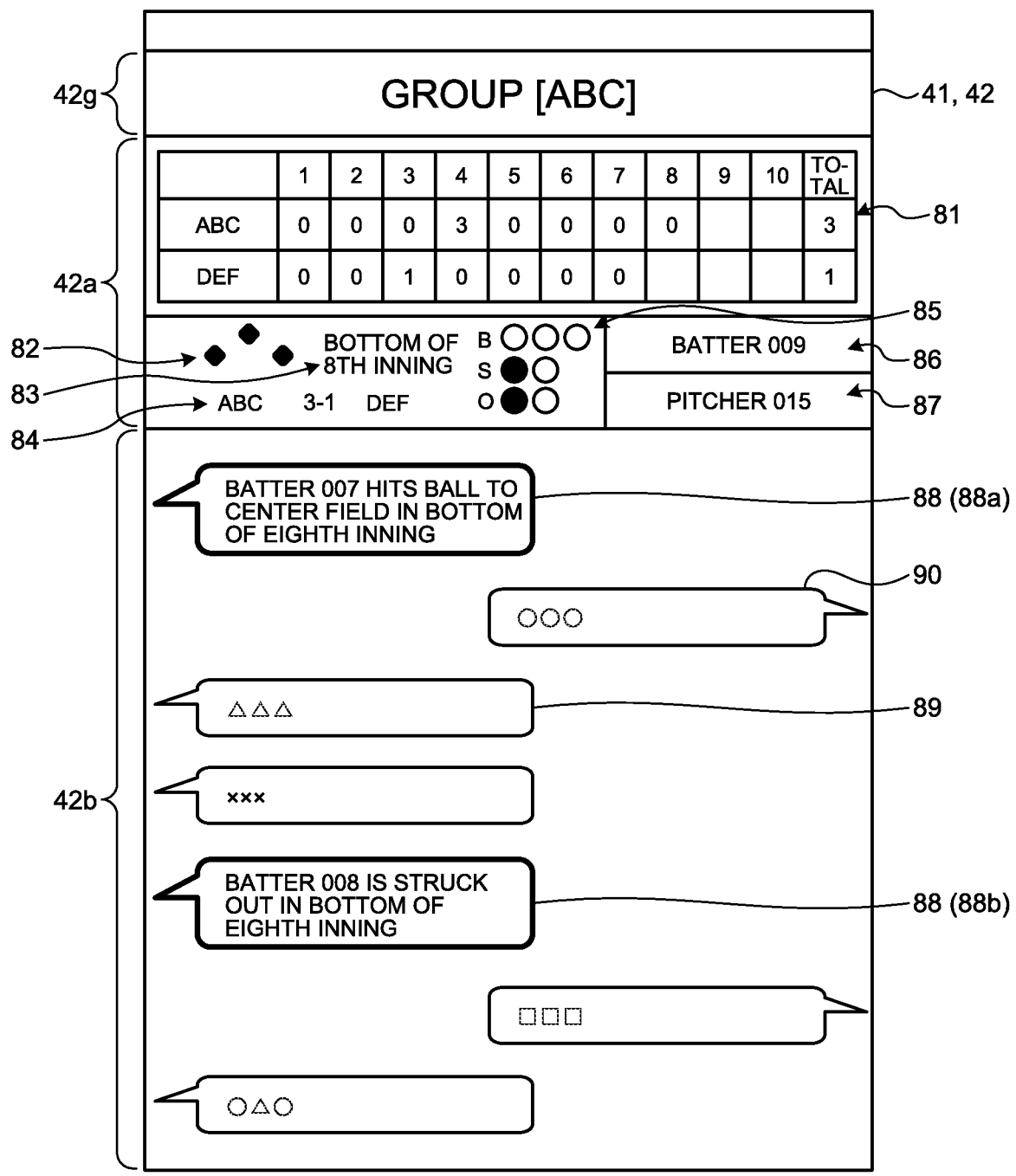
FIG. 10 is a diagram illustrating an example of an input unit and a display of a chat terminal device according to the second embodiment.

FIG. 10 is a diagram illustrating an example of the input unit 41 and the display 42 of the chat terminal device 140 according to the present embodiment. As illustrated in FIG. 10, the chat terminal device 140 includes the touch panel type input unit 41 and the display 42. That is, a touch panel as the input unit 41 is arranged so as to overlap with a display panel as the display 42.

The display 42 displays, for example, a score display region 42a, a chat display region 42b, and a group display region 42g. Score data is displayed in the score display region 42a. For example, in the score display region 42a, a scoreboard 81 for displaying a score for each inning, an advancement display 82 for displaying an advancement situation of a runner, an inning display 83 for displaying an inning, a score display 84 for displaying a total score of each team, a count display 85 for displaying the count of balls and the count of outs, a batter display 86 for displaying a batter, and a pitcher display 87 for displaying a pitcher are displayed. Note that the displaying in the score display region 42a is not limited thereto, and some displays may be omitted, for example.

Chat data is displayed in the chat display region 42b. For example, in the chat display region 42b, a server message 88 which is chat data generated by the server 30, other's message 89 which is chat data input through another chat terminal device 40A different from the chat terminal device 140, a user's message 90 which is chat data input through the chat terminal device 140, or the like is displayed. The server message 88 indicates a content of score data input to the server 30, for example, in a form of characters. A server message 88a on the upper side of FIG. 10 has a content indicating that, for example, the batter 007 hits a ball to center field in the bottom of the eighth inning. Further, a server message 88b on the lower side of FIG. 10 has a content indicating that the batter 008 is struck out in the bottom of the eighth inning.

Note that the server message 88 and the other's message 89 are displayed in an area on the left side of the chat display region 42b, for example. Further, the user's message 90 is displayed in an area on the right side of the chat display region 42b, for example. Further, the server message 88 and the other's message 89 may be displayed in a distinguishable form. For example, the type of a frame in which each message is displayed may be different for each message. As a result, the server message 88 and the other's message 89 can be distinguished. Information on a group to which an operator of the chat terminal device 140 belongs is displayed in the group display region 42g. Note that the user's message 90 may be a message composed of text data.

In a case where a touch operation, a scroll operation, or the like is performed on a predetermined region in a surface of the touch panel, the input unit 41 outputs a predetermined instruction signal including position information of the region on which the operation is performed, and an operation content. The position information is set so as to correspond to a position on the display 42, for example. Note that the configurations of the input unit 41 and the display 42 are not limited to the above-described configurations.

The communication unit 43 communicates information with an external device is a wired or wireless manner. The communication unit 43 transmits/receives video data, chat data, score data, and the like to/from the external server 30, for example.

The storage unit 144 includes a storage such as a hard disk drive or a solid state drive. Note that an external storage medium such as a removable disk may be used as the storage unit 144. The storage unit 144 stores an operating system of the chat terminal device 140, various programs for controlling operations of the input unit 41, the display 42, and the communication unit 43, a chat application for chatting, various programs, data, and the like. For example, the storage unit 144 may store frame data such as the score display region 42a, the chat display region 42b, or the group display region 42g to be displayed on the display 42.

In addition, the storage unit 144 stores therein a chat input program that causes a computer to perform: receiving pieces of game situation data each indicating a situation of a game and pieces of chat data each indicating a content of a chat corresponding to the game from the server that manages the pieces of game situation data and the pieces of chat data; storing the received game situation data and chat data in association with a time; displaying, in response to inputting the chat data, pieces of chat data each having a content corresponding to the game situation data at an input point in time, as pieces of candidate data on the display; and transmitting, in response to selection of one piece of the pieces of candidate data displayed on the display, the selected candidate data as the chat data to the server.

The storage unit 144 includes a score data storage unit 51, a chat data storage unit 52, a synchronization data storage unit 53, and a candidate data storage unit 54.

The score data storage unit 51 stores the score data received through the communication unit 43. Examples of the score data stored in the score data storage unit 51 include information such as batter score data, runner score data, and tag information. Note that the score data may include other information such as a fielder's action.

The chat data storage unit 52 stores the chat data received through the communication unit 43. FIG. 11 is a diagram illustrating an example of the chat data stored in the chat data storage unit 52. As illustrated in FIG. 11, the chat data includes an input ID 75, an inputter ID 76, an input content 77, and tag information 78.

One input ID 75 is created each time the chat data is input to or generated in the server 30. The inputter ID 76 is information for identifying an inputter of one piece of chat data. For example, in a case of the chat data generated by the server 30, the inputter ID 76 may be a predetermined value (for example, "999" or the like). The input content 77 is information indicating a content of a message displayed in the chat display region 42b. The input content 77 includes, for example, character data or predetermined illustration data. The tag information 78 is information for identifying chat data created for each input ID 75. One piece of tag information 78 is created each time the input ID 75 is created. Tag numbers (TC0054, TC0055, . . . ) are given to the tag information 78 in ascending order as indexes. Note that an ID number of the input ID 75 may be used as the tag information.

The synchronization data storage unit 53 stores synchronization data that associates score data with chat data. FIG. 12 is a diagram illustrating an example of the synchronization data stored in the synchronization data storage unit 53. As illustrated in FIG. 12, the synchronization data includes tag information 79 and upload time information 80. The tag information 79 is information corresponding to the tag information 78 of the chat data described above. The tag information 79 is arranged in the order according to the upload time information 80. For example, the same tag number (TC0054, TC0055, . . . ) as the corresponding tag information 78 is given to the tag information 79, but the present invention is not limited thereto. For example, a series of tag numbers independent of the tag information 78 may be added to the tag information 79. The upload time information 80 indicates a time when the score data and the chat data associated with the tag information 79 are uploaded to the server 30. With the tag information 79 and the upload time information 80, the score data and the chat data are stored in association with each other based on the upload time.

The candidate data storage unit 54 stores a plurality of pieces of candidate data. The candidate data is chat data having a content corresponding to game situation data at the time of inputting the chat data through the input unit 41. FIG. 13 is a diagram illustrating an example of the pieces of candidate data stored in the candidate data storage unit 54. As illustrated in FIG. 13, examples of the pieces of candidate data include phrases for expressing pleasure, celebration, and the like when the score is favorable, such as "yeah!", "congratulations", and "that's great", and phrases for expressing disappointment and the like when the score is unfavorable, such as "it's unfortunate" and "it's screwed up". In the candidate data, a priority is set for each of a case where the score is favorable and a case where the score is unfavorable. The pieces of candidate data are displayed in descending order of priority when inputting chat data.

The control unit 45 controls each of the input unit 41, the display 42, the communication unit 43, and the storage unit 144. Further, the control unit 45 performs arithmetic operation, processing, and the like according to the instruction signal from the input unit 41. The control unit 45 includes a processing device such as a central processing unit (CPU), and a storage device such as a random access memory (RAM) and a read only memory (ROM). The control unit 45 includes a communication control unit 61, a storage control unit 62, a display control unit 63, and a candidate data setting unit 64.

The communication control unit 61 accesses the server 30 via the communication unit 43 to receive score data, chat data, and the like stored in the server 30. In addition, the communication control unit 61 transmits chat data input or selected by the input unit 41 to the server 30 via the communication unit 43.

The storage control unit 62 stores, in the storage unit 144, the score data, the chat data, and the like acquired from the server 30 in association with the upload time.

The display control unit 63 controls a display content to be displayed on the display 42. The display control unit 63 controls a display content in the score display region 42a based on the score data acquired via the communication unit 43.

Further, the display control unit 63 controls a display content in the chat display region 42b based on the chat data acquired via the communication unit 43. When displaying the chat data in the chat display region 42b, the display control unit 63 displays a displayable number of pieces of chat data in the chat display region 42b side by side in one direction in time series based on the upload time. In the present embodiment, for example, as illustrated in FIG. 10, the pieces of chat data are displayed side by side in time series from the upper side to the lower side of the chat display region 42b in the drawing.

In addition, in a case where new chat data is stored in the server 30, the display control unit 63 acquires the latest chat data stored in the server 30 via the communication unit 43, and updates the display content in the chat display region 42b. In this case, the display control unit 63 determines whether a space for displaying new chat data exits below chat data displayed most recently in time series in the chat display region 42b. In a case where the space for displaying new chat data exits, the display control unit 63 displays new chat data in the space. Further, in a case where no space for displaying new chat data exists, the display control unit 63 scrolls the entire chat display region 42b in a direction to push, toward the upper side of the chat display region 42b, the oldest chat data displayed in the chat display region 42b in time series, that is the uppermost chat data displayed in the chat display region 42b. Then, the display control unit 63 displays new chat data in a space on the lower side of the chat display region 42b that is vacated by scrolling. As a result, the display control unit 63 can update the chat data displayed in the chat display region 42b in real time each time new chat data is uploaded to the server 30 and stored in the storage unit 144.

Further, the display control unit 63 can control the display content in the chat display region 42b based on past chat data stored in the storage unit 144. For example, when the operator slides a touch position upward or downward in a state of touching the chat display region 42b of the input unit (touch panel) 41, that is, when the operator performs an operation of manually scrolling the chat display region 42b, the display control unit 63 changes the chat data displayed in the chat display region 42b according to a scroll direction and a scroll amount. For example, when the operator slides the touch position upward, chat data uploaded later than the chat data that is currently displayed is displayed in the chat display region 42b. Further, when the operator slides the touch position downward, chat data uploaded earlier than the chat data that is currently displayed is displayed in the chat display region 42b. Note that a method of changing the chat data displayed in the chat display region 42b is not limited thereto, and another method such as a button, a keyboard, or a mouse may be used.

Figure 15:
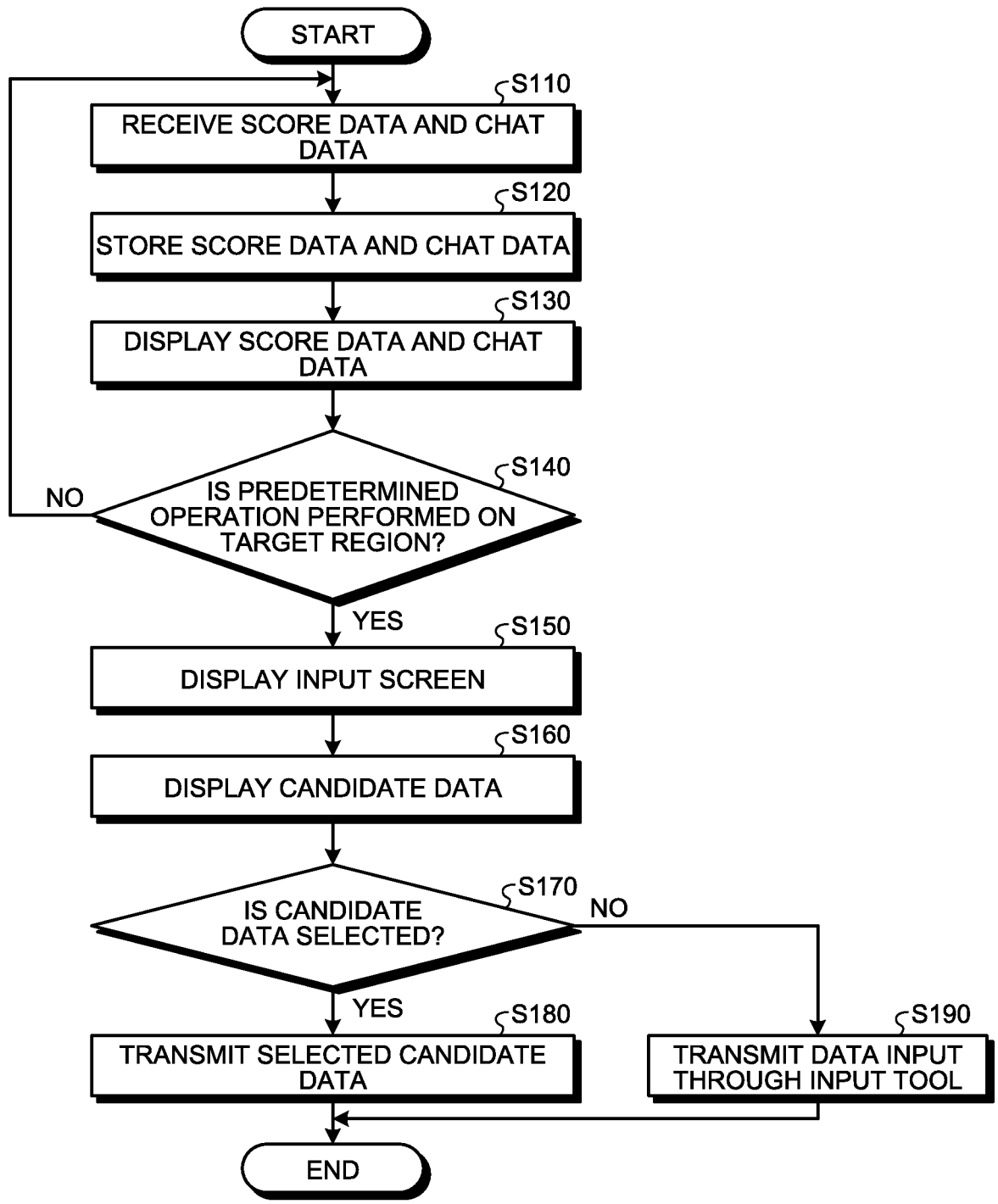
FIG. 15 is a flowchart illustrating an example of a chat input method.

Further, in the present embodiment, the display control unit 63 displays a screen for inputting chat data when a predetermined operation for inputting new chat data is performed by the input unit 41. FIG. 15 is a diagram illustrating an example of the input screen for inputting chat data. As illustrated in FIG. 15, the display control unit 63 displays a chat data input section 91, a candidate data display section 92, and an input tool display section 93 on the display 42.

The candidate data setting unit 64 selects candidate data to be displayed in the candidate data display section 92 among pieces of candidate data stored in the candidate data storage unit 54 in response to the predetermined operation performed on a target region 41$a$ in the input unit 41. The target region 41$a$ corresponds to a region in the display 42 in which the chat data is displayed. In the present embodiment, the target region 41$a$ is a region in the input unit 41 that overlaps with, for example, the server message 88, the other's message 89, and the user's message 90.

Figure 14:
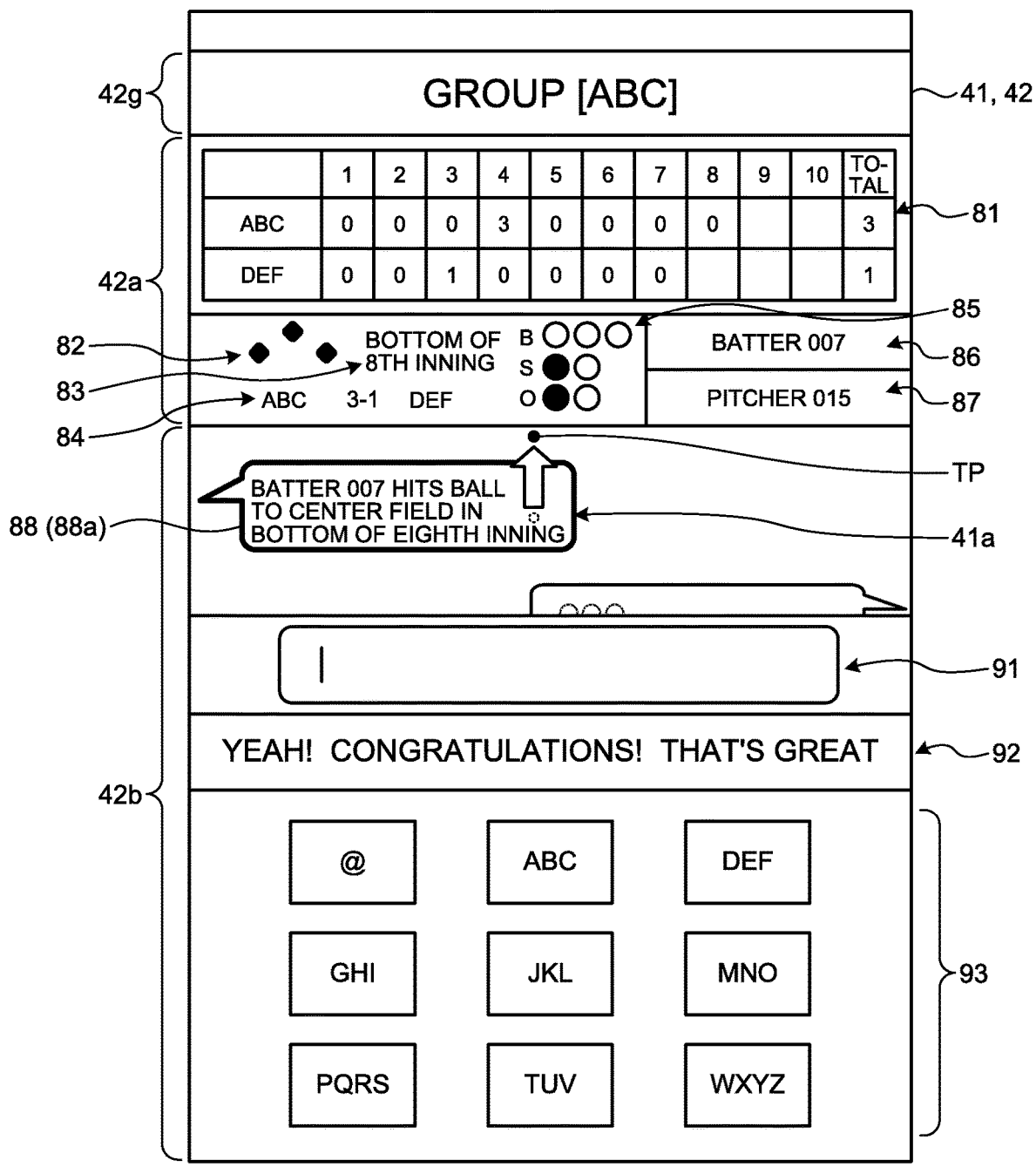
FIG. 14 is a diagram illustrating an example of an input screen for inputting chat data.

Examples of the predetermined operation include a so-called flick operation which is an operation of moving a touch point TP from inside to outside of the target region 41$a$. Note that, in FIG. 14, a black dot-shaped touch point TP is illustrated for convenience of explanation, but the touch point TP is not displayed in an actual implementation. In the flick operation, the candidate data setting unit 64 sets the candidate data based on a direction in which the touch point TP is moved. For example, the candidate data setting unit 64 selects phrases having a positive meaning, such as "yeah!", "congratulations", and "that's great", when the touch point TP is moved upward. In addition, the candidate data setting unit 64 can select phrases having a negative meaning such as "it's unfortunate" or "it's screwed up" when the touch point TP is moved downward. In addition, the candidate data setting unit 64 can select phrases having other meanings when the touch point TP is moved leftward or rightward.

Moreover, the candidate data setting unit 64 can set the candidate data based on a speed at which the touch point TP is moved. The candidate data setting unit 64 can select a stronger phrase in a case where the moving speed of the touch point TP in each direction described above is higher than a first threshold value, and can select a weaker phrase in a case where the moving speed of the touch point TP is lower than a second threshold value. The first threshold value and the second threshold value may be the same value or different values.

For example, in a case where the touch point TP is moved upward at a speed higher than the first threshold value, the candidate data setting unit 64 can select a stronger phrase having a positive meaning, such as "it's the best!" or "wonderful!". In addition, in a case where the touch point TP is moved downward at a speed higher than the first threshold, the candidate data setting unit 64 can select a stronger phrase having a negative meaning, such as "there's no hope" or "what are you doing?".

Further, for example, in a case where the touch point TP is moved upward at a speed lower than the second threshold value, the candidate data setting unit 64 can select a slightly weaker phrase having a positive meaning, such as "it's not bad". In addition, in a case where the touch point TP is moved downward at a speed lower than the second threshold, the candidate data setting unit 64 can select a slightly weaker phrase having a negative meaning, such as "that was close".

In order to distinguish the above-described flick operation from a scroll operation performed on the chat display region 42$b$, for example, an operation for preventing the scroll operation from being performed may be performed before performing the flick operation. Examples of such an operation include an operation of touching the target region 41$a$ to be subjected to the flick operation one or more times, or a long press of the target region 41$a$.

Further, the candidate data setting unit 64 can select candidate data based on a content of score data. The candidate data setting unit 64 selects or sets candidate data based on the latest score data from a time when the screen for inputting chat data is displayed. In this case, as the candidate data, a phrase related to the latest score data can be selected or set.

Further, the candidate data setting unit 64 can select the candidate data based on registration data that can be registered in the storage unit 144 in advance. Examples of the registration data include a team to which the user belongs, a game participant (player) designated by the user, and score data designated by the user. For example, in a case where a team is registered as the registration data, when score data that is advantageous for the registered team is acquired, the candidate data setting unit 64 selects a phrase for a case where the score is favorable. On the other hand, when score data that is advantageous for the registered team is acquired, the candidate data setting unit 64 selects a phrase for a case where the score is unfavorable.

Further, for example, in a case where a player is registered as the registration data, when score data that is advantageous for the registered player is acquired, the candidate data setting unit 64 can select a phrase for a case where the score is favorable, and when score data that is advantageous for the registered player is acquired, the candidate data setting unit 64 can select a phrase for a case where the score is unfavorable, similarly to the above. Further, the candidate data setting unit 64 can set, as candidate data, a phrase including a name of the registered player.

Further, for example, in a case where predetermined score data is registered as the registration data, when the registered score data is acquired, the candidate data setting unit 64 selects a phrase corresponding to the registered score data. For example, when a home run is registered as the registration data and home run score data is acquired, the candidate data setting unit 64 can select, as candidate data, a phrase corresponding to the score data, such as "home run!". Moreover, in a case where both a team and a player are registered as the registration data, when a player of the registered team or the registered player hit a home run, the candidate data setting unit 64 can select or set candidate data in which a phrase for a case where the score is favorable, such as "nice home run" or "yeah, home run" and a phrase including the score data are combined with each other. On the other hand, in a case where a player of an opposing team, not the registered team, hit a home run, the candidate data setting unit 64 can select or set candidate data in which a phrase for a case where the score is unfavorable, such as "they got a home run" or "oh, no! it's a home run", and a phrase including the score data are combined with each other. As for the phrases exemplified above as the candidate data, phrases registered in a text input tool or the like mounted on the chat terminal device 140 may be used, or phrases input as chat data may be used.

Next, an operation of the chat system 200 configured as described above will be described. FIG. 15 is a flowchart illustrating an example of a chat input method. In the chat system 200 according to the present embodiment, in the server 30, score data is input through the score input unit 20 as the game progresses, and chat data is input through each of the chat terminal devices 140 and 40A and the like. The server 30 generates chat data based on the score data. The server 30 stores the score data and the chat data so that the chat terminal devices 140 and 40A and the like can receive the score data and the chat data.

In this state, the chat application is started in the chat terminal device 140. By starting the chat application, in the chat terminal device 140, the communication control unit 61 acquires the score data and the chat data from the server 30 (Step S110). When the score data and the chat data are acquired from the server 30, the storage control unit 62 stores the acquired score data and the chat data in the storage unit 144 in association with each other based on an upload time (Step S120). The display control unit 63 displays the score data and the chat data stored in the storage unit 144 on the display 42 (Step S130).

The control unit 45 determines whether the predetermined operation is performed on the target region in the input unit 41 (Step S140). In a case where it is determined that the operation is not performed (No in Step S140), the control unit 45 repeatedly performs the processing from Step S110. In Step S140, in a case where it is determined that the predetermined operation is performed (Yes in Step S140), the display control unit 63 displays the input screen for inputting chat data (Step S150), and displays candidate data in the candidate data display section 92 of the input screen (Step S160). In Step S160, the candidate data setting unit 64 selects or sets the candidate data based on the latest score data from a time when the screen for inputting chat data is displayed.

The control unit 45 determines whether the candidate data displayed on the display 42 is selected (Step S170). For example, in a case where a region in the input unit 41 that overlaps with a display region of the candidate data displayed in the candidate data display section 92 is touched, the control unit 45 determines that the candidate data displayed in the touched region is selected. In a case where it is determined that the candidate data is selected (Yes in Step S170), the communication control unit 61 transmits the selected candidate data as chat data to the server 30 via the communication unit 43 (Step S180). Further, for example, when the region in the input unit 41 that overlaps with a display region of the input tool display section 93 is touched, the control unit 45 can determine that the candidate data is not selected. In a case where it is determined that the candidate data is not selected (No in Step S170), the communication control unit 61 transmits chat data input through an input tool displayed on the input tool display section 93 to the server 30 via the communication unit 43 (Step S190).

As described above, the chat terminal device 140 according to the present embodiment includes: the communication unit 43 that can receive chat data indicating a content of a chat from the server 30 that manages the chat data, and can transmit chat data to the server; the storage unit 144 that stores therein the chat data acquired through the communication unit 43; the display 42 that can display the chat data; the input unit 41 that includes the touch panel provided in the display 42; and the control unit 45 that causes the display 42 to display, as candidate data, chat data having a content corresponding to a predetermined operation in response to the predetermined operation performed on a target region in the touch panel corresponding to a region in the display 42 in which the chat data is displayed.

Further, the chat system 200 according to the present embodiment includes: the server 30 that manages chat data indicating a content of a chat; and the chat terminal device 140 that includes the communication unit 43 that can receive the chat data from the server 30, and can transmit chat data to the server, the storage unit 144 that stores the chat data acquired through the communication unit 43, the display 42 that can display the chat data, the input unit 41 that includes the touch panel provided in the display 42, and the control unit 45 that causes the display 42 to display, as candidate data, chat data having a content corresponding to a predetermined operation in a response to the predetermined operation performed on a target region in the touch panel corresponding to a region in the display 42 in which the chat data is displayed.

In addition, the chat input method according to the present embodiment includes: receiving pieces of chat data each indicating a content of a chat from the server 30 that manages the pieces of chat data; storing, in the storage unit 144, the received pieces of chat data; displaying, on the display 42 configured to display the chat data, in response to the predetermined operation performed on a target region in the touch panel provided in the display 42 corresponding to a region in the display 42 in which the pieces of chat data are displayed, pieces of chat data each having a content corresponding to the predetermined operation as pieces of candidate data; and transmitting, in response to selection of one piece of the pieces of candidate data displayed on the display 42, the selected candidate data as chat data to the server 30.

In addition, the chat input program according to the present embodiment causes a computer to perform: receiving pieces of chat data each indicating a content of a chat from the server 30 that manages the pieces of chat data; storing, in the storage unit 144, the received pieces of chat data; displaying, on the display 42 configured to display the chat data, in response to the predetermined operation performed on a target region in the touch panel provided in the display 42 corresponding to a region in the display 42 in which the pieces of chat data are displayed, pieces of chat data each having a content corresponding to the predetermined operation as pieces of candidate data; and transmitting, in response to selection of one piece of the pieces of candidate data displayed on the display 42, the selected candidate data as chat data to the server 30.

With this configuration, as the predetermined operation is performed, candidate data having a content corresponding to the predetermined operation is displayed on the display 42, and chat data can be input in response to selection of one piece of the candidate data. Therefore, the user can easily input chat data in a short time. As a result, it is possible to reduce a time and effort required for the user to input a chat.

In the chat terminal device 140 according to the present embodiment, the predetermined operation is an operation of moving the touch point TP from inside to outside of the target region 41a. Therefore, the candidate data can be displayed with a simple operation.

In the chat terminal device 140 according to the present embodiment, the control unit 45 sets candidate data based on a direction in which the touch point TP is moved. Therefore, different candidate data can be displayed by changing the moving direction of the touch point TP.

In the chat terminal device 140 according to the present embodiment, the control unit 45 sets candidate data based on a speed at which the touch point TP is moved. Therefore, different candidate data can be displayed by changing the moving speed of the touch point TP.

Third Embodiment

Figure 16:
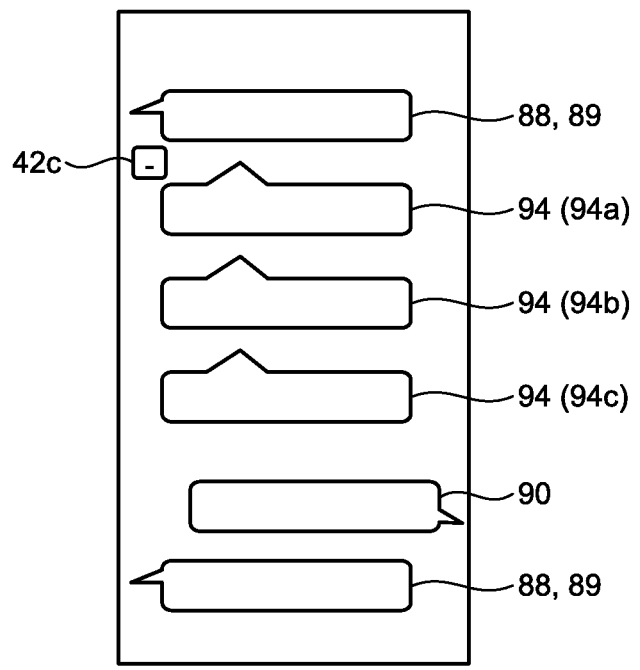
FIG. 16 is a diagram illustrating an example of an input unit and a display of a chat terminal device according to a third embodiment.
Figure 17:
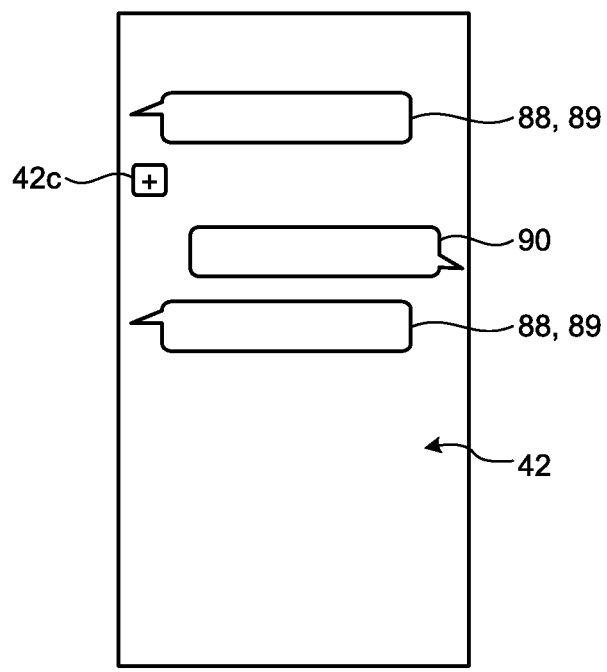
FIG. 17 is a diagram illustrating an example of an input unit and a display of the chat terminal device according to the third embodiment.

FIGS. 16 and 17 are diagrams illustrating an example of an input unit 41 and a display 42 of a chat terminal device 140 according to a third embodiment. In the present embodiment, a configuration of a chat system 200 including the chat terminal device 140 is similar to that of the second embodiment. In the present embodiment, a form in which a chat display region 42b is displayed is different from that of the second embodiment, and thus the difference will be mainly described.

As illustrated in FIG. 16, when subordinate chat data 94 which is chat data having a content related to one piece of chat data (for example, a server message 88, other's message 89, or a user's message 90) is received via a communication unit 43, a display control unit 63 can display the subordinate chat data 94 on a display 42. Hereinafter, the server message 88 and the other's message 89 will be described as an example of the one piece of chat data, but the chat data is not limited thereto, and the same description can be applied to the user's message 90.

Examples of the subordinate chat data 94 include chat data (a comment and the like) as a reply to one piece of chat data 88 or 89. The display control unit 63 can display the subordinate chat data 94 below the chat data 88 or 89, for example. In a case where a plurality of pieces of subordinate chat data 94 exist for one piece of chat data 88 or 89, the display control unit 63 can display the pieces of subordinate chat data 94 so that subordinate chat data 94 that is uploaded earliest to a server 30 is displayed at the uppermost position, for example. In the example illustrated in FIG. 16, three pieces of subordinate chat data 94a, 94b, and 94c exist for one piece of chat data 88 or 89. These pieces of subordinate chat data 94a, 94b, and 94c are displayed below one piece of chat data 88 or 89, and are also displayed so that subordinate chat data that is uploaded earliest is displayed at the uppermost position.

As illustrated in FIG. 16, the display control unit 63 can display a switching button 42c for performing switching between displaying and hiding of the pieces of subordinate chat data 94 for the chat data 88 or 89 for which the pieces of subordinate chat data 94 exist. The switching between the displaying and hiding of the pieces of subordinate chat data 94 can be performed by touching a region in the input unit 41 that overlaps with the switching button 42c. In the example illustrated in FIG. 16, the switching button 42c is in a display mode in which the pieces of subordinate chat data 94 are displayed. On the other hand, in the example illustrated in FIG. 17, the switching button 42c is in a non-display mode in which the pieces of subordinate chat data 94 are hidden. In the non-display mode, the display control unit 63 does not display the subordinate chat data 94 for one piece of chat data 88 or 89.

Figure 18:
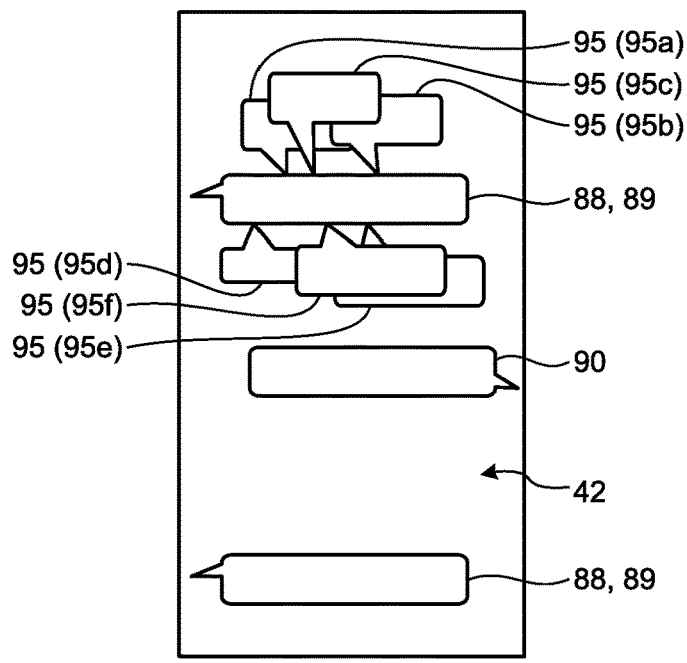
FIG. 18 is a diagram illustrating another example of the input unit and the display of the chat terminal device.

FIG. 18 is a diagram illustrating another example of the input unit 41 and the display 42 of the chat terminal device 140. As illustrated in FIG. 18, the display control unit 63 can perform time-limited displaying for pieces of subordinate chat data 95 such that the pieces of subordinate chat data 95 are displayed around chat data 88 or 89, to which the pieces of subordinate chat data 95 is subordinate, for a predetermined time and then are hidden in the display 42. The display control unit 63 can perform the time-limited displaying in response to a predetermined operation that is input through the input unit 41.

In a case of performing the time-limited displaying, the display control unit 63 can set the predetermined time based on a length of a chat content of each subordinate chat data 95. Alternatively, the display control unit 63 may set the same predetermined time for all pieces of subordinate chat data 95.

In a case where a plurality of pieces of subordinate chat data 95 exist for one piece of chat data 88 or 89, the display control unit 63 can display each of the pieces of subordinate chat data 95 for the predetermined time in a sequence based on an upload time. When displaying the plurality of pieces of subordinate chat data 95, the display control unit 63 may display the next subordinate chat data 95 after one piece of subordinate chat data 95 is hidden, or may display the next subordinate chat data 95 before one piece of subordinate chat data 95 is hidden. Further, the display control unit 63 displays, for example, as illustrated in FIG. 18, the pieces of subordinate chat data 95 (95a to 95f) subordinate to one piece of chat data 88 or 89 in an overlapping form so that subordinate chat data 95 that is displayed latest is positioned on top (displayed side) of the others. In this case, after all pieces of subordinate chat data 95 are displayed, the display control unit 63 may hide all pieces of subordinate chat data 95 at the same timing or from subordinate chat data 95 that is displayed earliest.

Further, for example, in the non-display mode illustrated in FIG. 17, when new subordinate chat data 94 for one piece of chat data 88 or 89 is received, the display control unit 63 may perform the timed displaying for the new subordinate chat data 94. In this case, the display control unit 63 can display the subordinate chat data 94 near the chat data 88 or 89 to which the subordinate chat data 94 is subordinate.

Note that, in the present embodiment, a storage unit 144 stores a chat display program that causes a computer to perform: receiving pieces of chat data from the server that manages the pieces of chat data each indicating a content of a chat; storing, in the storage unit 144, the received pieces of chat data in association with a time; displaying the pieces of chat data on the display 42; and performing the time-limited displaying for subordinate chat data that is subordinate to a certain piece of chat data among the pieces of chat data such that the subordinate chat data is displayed around the certain piece of chat data on the display 42 for a predetermined time and then is hidden.

Figure 19:
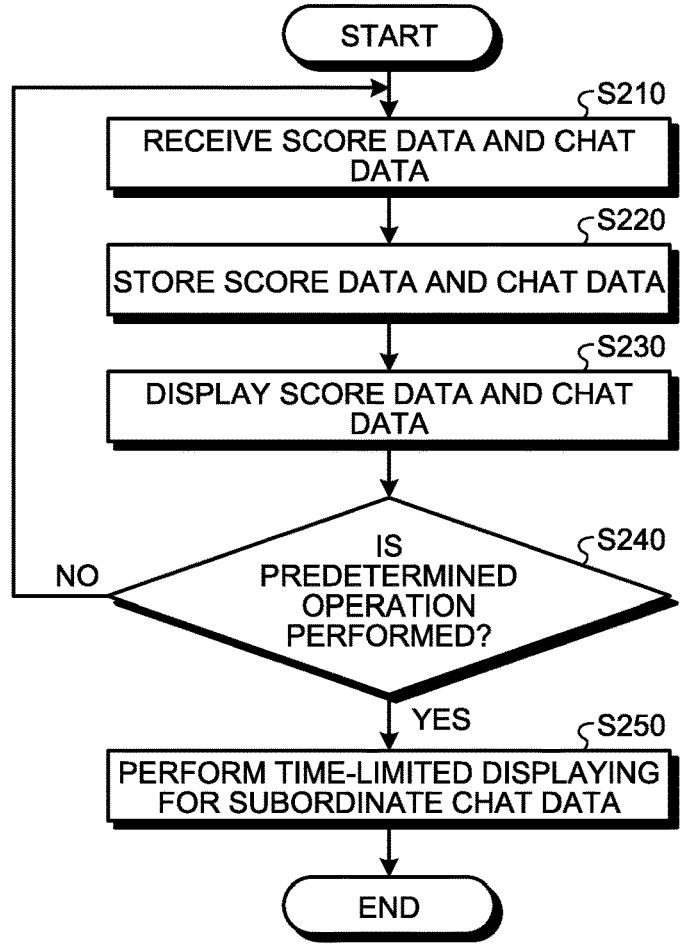
FIG. 19 is a flowchart illustrating an example of a chat display method.

Next, an operation of the chat terminal device 140 according to the third embodiment will be described. FIG. 19 is a flowchart illustrating an example of a chat display method. First, in the chat terminal device 140, a chat application is started. By starting the chat application, in the chat terminal device 140, the communication control unit 61 acquires the score data and the chat data from the server 30 (Step S210). When the score data and the chat data are acquired from the server 30, the storage control unit 62 stores the acquired score data and the chat data in the storage unit 144 in association with each other based on an upload time (Step S220). The display control unit 63 displays the score data and the chat data stored in the storage unit 144 on the display 42 (Step S230).

The control unit 45 determines whether a predetermined operation for performing the time-limited displaying for subordinate chat data 94 (or 95, the same applies hereinafter) is performed (Step S240). In a case where it is determined that the predetermined operation is not performed (No in Step S240), the control unit 45 repeatedly performs the processing from Step S210. In a case where it is determined in Step S240 that the predetermined operation is performed (Yes in Step S240), the display control unit 63 performs the time-limited displaying for the subordinate chat data 94 (Step S250).

As described above, the chat terminal device 140 according to the present embodiment includes: the communication unit 43 configured to receive pieces of chat data each indicating a content of a chat from the server that manages the pieces of chat data and to transmit pieces of chat data to the server; the storage unit 144 configured to store therein the pieces of chat data received through the communication unit 43 in association with a time; the display 42 configured to display the pieces of chat data; and the control unit 45 configured to cause the display 42 to display the pieces of chat data received through the communication unit 43 and to perform the time-limited displaying for subordinate chat data that is subordinate to a certain piece of chat data among the pieces of chat data such that such that the subordinate chat data is displayed around the certain piece of chat data on the display 42 for a predetermined time and then is hidden.

In addition, the chat system according to the present embodiment includes: the server that manages pieces of chat data each indicating a content of a chat; and the chat terminal 40 described above.

Further, a chat display method according to the present embodiment includes: receiving pieces of chat data each indicating a content of a chat from the server that manages the pieces of chat data; storing, in the storage unit 144, the received pieces of chat data in association with a time; displaying the pieces of chat data on the display 42; and performing the time-limited displaying for subordinate chat data that is subordinate to a certain piece of chat data among the pieces of chat data such that the subordinate chat data is displayed around the certain piece of chat data on the display 42 for a predetermined time and then is hidden.

Further, a chat input program according to the present embodiment causes a computer to perform: receiving pieces of chat data each indicating a content of a chat from the server that manages the pieces of chat data; storing, in the storage unit 344, the received pieces of chat data in association with a time; displaying the pieces of chat data on the display 42; and performing the time-limited displaying for subordinate chat data that is subordinate to a certain piece of chat data among the pieces of chat data such that the subordinate chat data is displayed around the certain piece of chat data on the display 42 for a predetermined time and then is hidden.

With this configuration, subordinate chat data and chat data to which the subordinate chat data is subordinate can be displayed in a distinguishable form. Further, displaying on the display is organized by hiding the subordinate chat data. As a result, the user can easily understand a relationship between the chat data to which the subordinate chat data is subordinate and the subordinate chat data, and easy-to-view displaying can be achieved. In addition, when the user inputs new chat data, independent chat data and subordinate chat data can be separately input.

The chat terminal device 140 according to the present embodiment further includes the input unit 41 through which an operation is input, and the control unit 45 performs the time-limited displaying in response to a predetermined operation that is input through the input unit 41. As a result, subordinate chat data can be displayed at a timing desired by the user.

In the chat terminal device 140 according to the present embodiment, in a case where a plurality of pieces of subordinate chat data exist for a piece of chat data, the control unit 45 displays each of the pieces of subordinate chat data for the predetermined time in a sequence based on a time when each of the pieces of subordinate chat data is stored in the storage unit 144. Accordingly, for example, by displaying the pieces of subordinate chat data 94 in time series, the user can easily understand a time-series relationship among the plurality of pieces of subordinate chat data.

In the chat terminal device 140 according to the present embodiment, the control unit 45 sets the predetermined time based on a length of a chat content of the subordinate chat data. As a result, it is possible to prevent subordinate chat data having a short chat content from being displayed for an excessively long time and shorten a waiting time of the user. In addition, it is possible to prevent a display time of subordinate chat data having a long chat content from being excessively short, and to allow the user to fully understand the chat content.

In the chat terminal device 140 according to the present embodiment, the control unit 45 performs the time-limited displaying in response to reception of the subordinate chat data. As a result, the received subordinate chat data can be displayed in a form that catches the eye of the user.

According to the embodiments, it is possible to provide the chat terminal device, the chat system, the chat input method, and the chat input program, which can reduce a time and effort required for the user to input a chat.

Additional aspects of the present disclosure include, but are not limited to:

1. A chat terminal device comprising:
 a communication unit that is configured to receive chat data indicating a content of a chat from a server that manages the chat data, and is configured to transmit the chat data to the server;
 a storage unit that stores therein the chat data received through the communication unit;
 a display that is configured to display the chat data;
 an input unit that includes a touch panel provided in the display; and
 a control unit that causes the display to display, in response to a predetermined operation performed on a target region in the touch panel corresponding to a region in the display in which the chat data is displayed, the chat data having a content corresponding to the predetermined operation as candidate data.

2. The chat terminal device according to the above aspect 1, wherein
 the predetermined operation is an operation of moving a touch point from inside to outside of the target region.

3. The chat terminal device according to the above aspect 2, wherein
 the control unit sets the candidate data based on a direction in which the touch point is moved.

4. The chat terminal device according to the above aspect 3, wherein
 the control unit sets the candidate data based on a speed at which the touch point is moved.

5. A chat system comprising:
 a server that manages chat data indicating a content of a chat; and
 the chat terminal device according to the above aspect 1.

6. A chat input method comprising:
 receiving pieces of chat data each indicating a content of a chat from a server that manages the pieces of chat data;
 storing the received pieces of chat data;
 displaying, on a display configured to display the chat data, in response to a predetermined operation performed on a target region in a touch panel provided in the display corresponding to a region in the display in which the pieces of chat data are displayed, the pieces of chat data each having a content corresponding to the predetermined operation as pieces of candidate data; and
 transmitting, in response to selection of one piece of the pieces of candidate data displayed on the display, the selected candidate data as the chat data to the server.

7. A recording medium recording a chat input program that causes a computer to perform:
 receiving pieces of chat data each indicating a content of a chat from a server that manages the pieces of chat data;
 storing the received pieces of chat data;

displaying, on a display configured to display the chat data, in response to a predetermined operation performed on a target region in a touch panel provided in the display corresponding to a region in the display in which the pieces of chat data are displayed, the pieces of chat data each having a content corresponding to the predetermined operation as pieces of candidate data; and transmitting, in response to selection of one piece of the pieces of candidate data displayed on the display, the selected candidate data as the chat data to the server.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A chat terminal device comprising:
a communication unit that is configured to receive game situation data indicating a situation of a game and chat data indicating a content of a chat corresponding to the game from a server that manages the game situation data and the chat data, and is configured to transmit the chat data to the server;
a storage unit that stores therein the game situation data and the chat data received through the communication unit and preliminarily stores therein a plurality of pieces of candidate chat data corresponding to the game situation data;
an input unit through which the chat data is input;
a display that is configured to display the chat data; and
a control unit that
  determines whether a predetermined input operation to input new chat data is performed through the input unit,
  selects, when it is determined that the predetermined input operation is performed, from among the pieces of candidate chat data preliminarily stored in the storage unit, one or more pieces of candidate chat data to be displayed on the display based on the game situation data at a point in time of the predetermined input operation, and
  causes the display to display the selected one or more pieces of candidate chat data.

2. The chat terminal device according to claim 1, wherein the control unit selects the one or more pieces of candidate chat data based on the game situation data and registration data registered in advance.

3. The chat terminal device according to claim 2, wherein the registration data includes data regarding a team participating in the game or a participant participating in the game.

4. The chat terminal device according to claim 2, wherein the registration data includes predetermined game situation data in the game.

5. A chat system comprising:
a server that manages game situation data indicating a situation of a game and chat data indicating a content of a chat corresponding to the game; and
the chat terminal device according to claim 1.

6. A chat input method comprising:
receiving pieces of game situation data each indicating a situation of a game and pieces of chat data each indicating a content of a chat corresponding to the game from a server that manages the pieces of game situation data and the pieces of chat data;
storing, in a storage unit, the received pieces of game situation data and chat data;
preliminarily storing, in the storage unit, a plurality of pieces of candidate chat data corresponding to each of the pieces of game situation data;
determining whether a predetermined input operation to input new chat data is performed;
selecting, when it is determined that the predetermined input operation is performed, from among the pieces of candidate chat data preliminarily stored in the storage unit, one or more pieces of candidate chat data to be displayed on the display based on the game situation data at a point in time of the predetermined input operation;
causing a display to display the selected one or more pieces of candidate chat data; and
transmitting, as the new chat data, to the server, one piece of candidate chat data that is selected from among the selected one or more pieces of candidate data displayed on the display.

7. A non-transitory computer-readable recording medium containing a chat input program that causes a computer to perform:
receiving pieces of game situation data each indicating a situation of a game and pieces of chat data each indicating a content of a chat corresponding to the game from the server that manages the pieces of game situation data and the pieces of chat data;
storing, in a storage unit, the received pieces of game situation data and chat data;
preliminarily storing, in the storage unit, a plurality of pieces of candidate chat data corresponding to each of the pieces of game situation data;
determining whether a predetermined input operation to input new chat data is performed;
selecting, when it is determined that the predetermined input operation is performed, from among the pieces of candidate chat data preliminarily stored in the storage unit, one or more pieces of candidate chat data to be displayed on the display based on the game situation data at a point in time of the predetermined input operation;
causing a display to display the selected one or more pieces of candidate chat data; and
transmitting, as the new chat data, to the server, one piece of candidate chat data that is selected from among the selected one or more pieces of candidate data displayed on the display.

8. The chat terminal device according to claim 1, wherein the control unit selects the one or more pieces of candidate chat data based on latest game situation data from a time when the display displays a screen used for inputting the chat data.

9. The chat terminal device according to claim 1, wherein the control unit includes a communication control unit, and
the communication control unit controls the communication unit to transmit, as the new chat data, one piece of candidate chat data that is selected through the input unit from among the selected one or more pieces of candidate chat data displayed on the display.

* * * * *